US012012428B2

(12) United States Patent
Jobber et al.

(10) Patent No.: US 12,012,428 B2
(45) Date of Patent: Jun. 18, 2024

(54) METHOD FOR PREPARING AN ACTIVATED LIGNIN COMPOSITION

(71) Applicant: Trespa International B.V., Weert (NL)

(72) Inventors: Andrew Sidney Jobber, Weert (NL); Luca Ferrari, Weert (NL); Kim Mechtilda Ferdinand Helwegen, Weert (NL); Somayeh Kazemi, Weert (NL); Atte Ilari Virtanen, Weert (NL)

(73) Assignee: TRESPA INTERNATIONAL B.V., Weert (NL)

(*) Notice: Subject to any disclaimer, the term of this patent is extended or adjusted under 35 U.S.C. 154(b) by 1252 days.

(21) Appl. No.: 16/604,781

(22) PCT Filed: Apr. 16, 2018

(86) PCT No.: PCT/NL2018/050235
§ 371 (c)(1),
(2) Date: Oct. 11, 2019

(87) PCT Pub. No.: WO2018/190720
PCT Pub. Date: Oct. 18, 2018

(65) Prior Publication Data
US 2021/0009618 A1    Jan. 14, 2021

(30) Foreign Application Priority Data
Apr. 14, 2017 (NL) .................................... 2018722

(51) Int. Cl.
*C07G 1/00* (2011.01)
*B29C 70/26* (2006.01)
(Continued)

(52) U.S. Cl.
CPC ............ *C07G 1/00* (2013.01); *B29C 70/26* (2013.01); *C08J 5/245* (2021.05);
(Continued)

(58) Field of Classification Search
CPC .......... C08J 5/245; C08J 2397/00; C08J 5/045
See application file for complete search history.

(56) References Cited

U.S. PATENT DOCUMENTS 3,444,732 A * 5/1969 McKinley ............... B29C 65/18
156/64
4,113,675 A   9/1978 Clarke et al.
(Continued)

FOREIGN PATENT DOCUMENTS

DE    43 31 656 A1    9/1994
WO    94/24192 A1    10/1994
(Continued)

OTHER PUBLICATIONS

International Search Report for International Application No. PCT/NL2018/05235 mailed on Aug. 10, 2018.

*Primary Examiner* — Sonya M Sengupta
(74) *Attorney, Agent, or Firm* — Suiter Swantz IP

(57) ABSTRACT

The present invention relates to a method for preparing an activated lignin composition. In addition, the present invention also relates to a method for further processing the thus activated lignin composition in a method for preparing a lignin-phenol formaldehyde resin. Such a lignin-phenol formaldehyde resin can be used in the manufacturing of laminates by replacing the traditional synthetic phenol formaldehyde resin.

25 Claims, 5 Drawing Sheets

Lignin Activation with variation in pH

(51) Int. Cl.
*C08J 5/24* (2006.01)
*B29K 1/00* (2006.01)
*B29K 311/12* (2006.01)
*B29L 9/00* (2006.01)

(52) U.S. Cl.
CPC ..... *B29K 2001/00* (2013.01); *B29K 2311/126* (2013.01); *B29L 2009/00* (2013.01); *C08J 2397/00* (2013.01)

(56) References Cited

U.S. PATENT DOCUMENTS

| | | |
|---|---|---|
| 5,866,642 A | 2/1999 | McVay et al. |
| 2021/0009618 A1* | 1/2021 | Jobber ................. C08L 97/005 |

FOREIGN PATENT DOCUMENTS

| | | | |
|---|---|---|---|
| WO | 2007/124400 A2 | 11/2007 | |
| WO | 2012/106808 A1 | 8/2012 | |
| WO | 2012/113058 A1 | 8/2012 | |
| WO | 2013/144454 A1 | 10/2013 | |
| WO | 2014/124541 A1 | 8/2014 | |
| WO | WO-2018190720 A1 * | 10/2018 | ............. B29C 70/26 |

* cited by examiner

Lignin Activation with variation in pH

Lignin Activation with variation in temperature

Lignin Activation: comparison between kraft lignin and sodium lignosulphonate

Molar mass distributions for examples 4 and 16 against PSS standards.

Different charges of formaldehyde relative to the Kraft Lignin a ——— Sample 20 (30 min Condensation)
b ········· Sample 21 (40 min Condensation)
c ——— Sample 22 (10 min Condensation)

Molar mass distributions for examples 20, 21 & 22 – samples condensed to a free phenol of 5.7%
(Aside: phenol is not seen as it has too low a molecular weight).

METHOD FOR PREPARING AN ACTIVATED LIGNIN COMPOSITION

DESCRIPTION TECHNICAL FIELD AND BACKGROUND

The present invention relates to a method for preparing an activated lignin composition, especially an activated lignin composition containing methylol functional groups. In addition, the present invention also relates to a method for further processing the thus activated lignin composition in a method for preparing a lignin-phenol formaldehyde resin. Such a lignin-phenol formaldehyde resin can be used in the manufacturing of laminates by replacing the traditional synthetic phenol formaldehyde resin.

Laminates are products that are comprised of multiple layers of semi-finished material (either impregnated papers or prepregs), that are then compressed and fused together. In general, laminate products typically contain about 55-80 wt. % wood derived material (e.g. fibres or paper) and about 20-45 wt. % thermosetting resin. The fusing of the compressed stack of layered semi-finished material, is brought about by the condensation (or polymerisation reaction) of the thermosetting resin; which is normally driven by the application of heat, and by such means taken to a desired degree of final curing. This can be achieved using discontinuous or continuous processing methods. A common discontinuous method is the use of a multi-daylight press wherein stacks of layered semi-finished material are placed within the daylights of the press and then subjected to a program of pressurised compression and applied heat, which result in a laminate product. A general product definition for such laminates is "High Pressure Laminate" or "HPL". An example of a continuous method is the use of a continuous press; wherein the semi-finished material is continually fed into the press from multiple feeds, they are then compressed and heated to form a laminate product. A general product definition for such laminates is "Continuous Pressure Laminate" or alternatively "Continuous Pressed Laminate" both of which can be abbreviated to "CPL". The product norm or standard EN438 has a general definition for laminates termed as HPL or CPL, however in this document the definition of laminates as described is somewhat wider.

Decorative laminates are generally composed of a core layer or stack of core layers, with a decorative layer either on one or both sides. Laminates of this type are employed for interior or exterior uses in the building industry, being used as cladding panels or self-supporting units, depending on their thickness.

Decorative high-pressure compact laminates manufactured by the present applicant are known for outdoor applications. Such laminates consist of layers of wood-based fibres (paper and/or wood) impregnated with thermosetting resins and surface layer(s) on one or both sides, having decorative colours or designs. A transparent topcoat can be added to the surface layer(s) and cured to enhance weather and light protecting properties. These components are bonded together with simultaneous application of heat and high specific pressure to obtain a homogeneous non-porous material with increased density and integral decorative surface. These laminates have been disclosed in, inter alia, U.S. Pat. Nos. 4,801,495, and 4,789,604, US Patent application 2013/0078437. The present application is not restricted only to exterior compact laminates, but the scope of this application also includes interior laminates, which can be either thin or compact.

The environmental aspects of phenol resins are under discussion. Lignin is a natural polymer, which can be extracted from for example wood. As lignin is a natural biopolymer, its use as a component in resins instead of synthetic materials is a way to come up with a more environmentally friendly resin composition. Lignin is an aromatic polymer and a major constituent in wood, and has been extensively investigated as a suitable substitute for phenol during production of phenol-formaldehyde resins. These are used during manufacturing of structural wood products such as plywood, oriented strand board and fibreboard. During synthesis of such adhesives, lignin, partially replacing phenol, is reacted with formaldehyde in the presence of either basic or acidic catalyst to form a highly cross-linked aromatic resins; termed novolacs (when utilizing acidic catalysts), or resoles (when utilizing basic catalysts). The amounts of the phenol that can be replaced by lignin are, inter alia, determined by the lower reactivity of lignin.

International application WO 2016/157141 relates to a method for the making an activated lignin composition comprising the following steps: i) providing a lignin, such as an alkaline lignin, ii) adding one or more aqueous or water soluble dispersant(s), such as water, iii) adding an alkali metal-based such as NaOH, iv) optionally adding one or more substituted and/or non-substituted hydroxybenzene compounds, such as phenol, and v) mixing said components and at the same time reducing the particle size of the lignin, preferably by using high shear treatment, whereby said components are subjected to high shear and flow, thus providing said composition.

International application WO2015123781 relates to a method for preparing a cross-linkable resin, the method comprising the step of: (i) converting a hexose to 5-hydroxymethyl furfural (HMF) in the presence of a phenolic compound and a catalyst that promotes formation of covalent bonds between a carbon atom of the aromatic ring of the phenolic compound and the carbon of the formyl group of the HMF to form the resin, wherein the phenolic compound is selected from unsubstituted phenol, cardanol and combinations thereof, especially wherein the phenolic compound is obtained from a lignocellulosic biomass. The biomass is one or more of pyrolysis oil, liquefied biomass, lignin, de-polymerized lignin, phenolated de-polymerized lignin, and liquefied lignin.

International application WO2013144454 relates to a method for increasing the reactivity of lignin, comprising the following steps: a) forming, under heating at a temperature of 30-70° C., an aqueous dispersion comprising alkali and lignin, wherein the alkali comprises a hydroxide of an alkali metal; and b) heating the dispersion formed in step a) at a temperature of 50-95° C. for producing alkylated lignin, wherein step b) is carried out for 15 minutes-24 hours, and wherein the method comprises, before step a), the step i) of reacting lignin with a compound selected from the class of phenols. This International application WO2013144454 uses the term "alkylated lignin" and that would imply the covalent bonding of a carbon chain to the lignin. On the basis of the disclosure it means lignin dissolved in alkali, rather than an alkylation reaction whereby a hydrocarbon chain is covalently bonded to the lignin. One embodiment of WO2013144454 is to provide a methylolated lignin (termed as "hydroxymethylated lignin" in WO2013144454) obtained by the reaction of formaldehyde with lignin, which is then used to make a binder by the addition of phenol, further formaldehyde and further sodium hydroxide.

International application WO2015079107 relates to a method for treating lignin, comprising the following steps: a) dissolving lignin into an aqueous composition, which contains a compound selected from the class of phenols and alkali, while keeping the temperature of the composition at 40-85° C., wherein the alkali comprises a hydroxide of an alkali metal; and b) heating the composition at a temperature, which is higher than the temperature of the composition in step a), with the proviso that the temperature of the composition does not exceed 100° C., while keeping the pH of the composition at a pH value of 6-14. According to this publication further alkali is added to the composition in step b), thus alkali is added to the composition in step a) and in step b). This publication mentions that dissolving lignin into a composition of phenol, alkali and water, at the specific temperature used affects the time needed to dissolve lignin into the composition.

International application WO2016207493 relates to a method for recovering lignin from alkaline lignin containing feedstock by a thermal treatment, wherein the method comprises a simultaneous activation and precipitation of the lignin in the feedstock by a thermal treatment being carried out without added demethylation and demethoxylation enhancing agent, by applying temperature between 200 and 250° C. and a retention time between 0.5 and 10 hours to the feedstock, wherein the alkaline lignin containing feedstock is from alkaline pulping process, e.g. kraft black liquor. After the activation and precipitation, the lignin material is purified by acidic washing.

International application WO2017006215 relates to a method for increasing the reactivity of lignin, a resin composition comprising said lignin and use of said resin composition. The method comprises the following steps: providing a mixture comprising lignin and an alkali solution wherein the concentration of the alkali solution of the mixture is between 5-50% by weight, storing said mixture for a period of at least 1 day whereby the reactivity of the lignin is increased, wherein the storage is done at room temperature, i.e. at a temperature of 20-30° C. The mixture comprises 10-80% by weight of lignin.

German Offenlegungsschrift DE 43 31 656 relates to a binder mixture containing 45 to 85% by weight of methylol-modified lignin, 5 to 25% by weight of resole and 10 to 30% by weight of a di- or polyisocyanate, wherein the methylol group-modified lignin and the resol are in aqueous solution, further containing 1 to 15% by weight of ester, e.g. triacetin, as accelerator.

WO2007124400 relates to a method for the production of a modified renewable aromatic material with lower softening temperature or increased reactivity in a thermoset system comprising subjecting a renewable aromatic material to a chemo-thermo-mechanical (CTM) treatment under mechanical shear, at a maximum temperature of about 100-220 [deg.]C. and a pressure of about 0.5-10 atmospheres in the presence of an additive which lowers the softening point of the renewable aromatic material or an additive that enhances reactivity of the renewable aromatic material to produce a modified renewable aromatic material with lower softening temperature or increased reactivity, wherein the renewable aromatic material is lignin, tannin or cardanol or a combination thereof.

The present inventors found that for laminate (including HPL and CPL) applications, it is necessary for the resin binder composition to be able to impregnate kraft papers or wood fibres and to have sufficient flow during panel pressing. In Lignin Phenol Formaldehyde (LPF) binders described by the prior art, the lignin has been co-condensed with the phenol formaldehyde or simply post added. This aspect will generally result in binders that are too viscous for the desired application.

In addition, it is known that phenol in the presence of an alkali can form a phenolate ion. This can undergo resonance and form three structures, thus giving rise to active hydrogens at the two ortho positions and the para position. Any of these are capable of reacting with formaldehyde and forming a methylol group. This methylolation reaction can be identified as the first reaction step in making a phenolic resin. The methylolated phenol thus formed can react with a further two molecules of formaldehyde to form dimethylolated phenol and trimethylolated phenol and these methylolated phenol species can react with themselves to form larger oligomer units via condensation reactions. The methylolation and condensation reactions can occur simultaneously.

Since lignin consists of aromatic units, some of which are analogous to phenol, with a phenolic OH group and a free ortho position, it has long been thought that it can partake in the above reactions as a phenol substitute. However, these active sites are relatively rare (in terms of reactive sites divided by molecular weight of lignin macromolecule), or may be sterically hindered. Consequently, the success of lignin phenol formaldehyde resins has been somewhat limited. Indeed, if one were to react a mixture of phenol, formaldehyde and lignin together; it is found that the formaldehyde reacts preferentially with the phenol. Furthermore, methylolation increases the reactivity with formaldehyde, so the methylolated and dimethylolated phenols have higher kinetic rates of reaction. This unfortunately leaves the lignin left behind in terms of reaction kinetics, and therefore it is questionable how well it is incorporated into the final 3D polymer network.

BRIEF SUMMARY

The object of the present invention is to provide a method for preparing an activated lignin composition.

Another object of the present invention is to provide a process on basis of lignin wherein the above discussed methylolation reaction is favoured over the condensation reaction.

Another object of the present invention is to provide an activated lignin composition that has improved functionality towards reaction with phenol formaldehyde reaction species and the consequent oligomers.

Another object of the present invention is to provide a method for preparing a lignin-phenol formaldehyde resin on the basis of an activated lignin composition.

Another object of the present invention is to provide a lignin-phenol formaldehyde resin that can be used in the manufacturing of laminates.

The present invention thus relates to a method for preparing an activated lignin composition, comprising the following steps:
i) providing a liquid lignin having free active hydrogen positions;
ii) heating said liquid lignin to a temperature in a range of 60° C. and 85° C.;
iii) adding formaldehyde to said heated liquid lignin under stirring conditions, wherein the formaldehyde is added in a stoichiometric excess ratio of >1:1;
iv) maintaining the temperature of the mixture according to iii) in a range of 60° C. and 85° C., during a time period of at least 10 minutes.

The present inventors found that one or more of the above identified objects of the present invention can be achieved by the method steps i)-iv) as recited above. According to the present invention the liquid lignin, with free active hydrogen positions, is reacted with formaldehyde under alkali conditions, and at temperatures that favour the methylolation reaction over the condensation reaction. Furthermore after the dosing of formaldehyde, the mixture is held at a temperature favouring the methylolation reaction—but not the condensation reaction—for a period of time. This will result in an activated lignin that has improved functionality towards reaction with phenol-formaldehyde reaction species and the consequent oligomers. The methylolation reaction and the condensation reaction will be discussed later in this document. The term "stoichiometric excess ratio of >1:1" is to be read as relative to the lignin's free active hydrogen positions.

The present invention specifically differs from WO2013144454 in that the formaldehyde added to methylolate the lignin is in stoichiometric excess to the active hydrogens present (of which there are two on every p-hydroxyphenyl unit and one on every guaiacyl unit, providing that these units are not in a condensed state within the lignin macromolecule); this can be determined by NMR. Therefore this approach gives the maximum methylolation or functionalisation of the lignin to other reactive phenolic resin species. Furthermore the present process conditions are uniquely optimised to give a high yield of methylol functionalisation without significant loss via condensation reactions of these groups with one another or with those of a co-synthesised phenol-formaldehyde resin. The methylolation and condensation reactions are separated into specific process steps by the present invention. This has not been done, nor suggested in WO2013144454.

The present invention is specifically applicable to the industrial impregnation of paper which can be pressed to form laminates. Also it is applicable to the impregnation of wood fibres that can be pressed to form a "pre-preg" boards that can likewise be combined with other elements and pressed to form laminates.

The liquid lignin as mentioned in step i) can be prepared from commercially sourced kraft lignin. However, any lignin could in principle be used providing that it results in a homogeneous liquid containing the lignin and is suitable for the activation step described by the present invention. Therefore the lignin could be sourced from hardwood, softwood or annual plants (e.g. grasses or crop residues), or a blend thereof. It could be natural lignin, or one that has undergone a process to separate it from the rest of the bio-mass; e.g. kraft lignin, organosolv lignin, lignosulphonate lignin, lignin extracted from pyrolysis oil, or a blend of such lignins. The lignin may be modified from the natural state by either the process used to separate it from the bio-mass and/or by a desired chemical modification.

The chemical functionality of the lignin could be changed by, for example, alterations in the distribution of naturally occurring lignin functional groups and linkages (e.g. aliphatic OH, aromatic OH, carboxylic acids, β-O-4 etc.), the introduction of new chemical functional groups brought about by the bio-mass separation process (e.g. sulphonic acid groups in lignosulphonate lignin), further chemical modification of the lignin brought about by reaction with a reagent or catalyst that is not formaldehyde or a form of formaldehyde (e.g. paraformaldehyde, 1,3,5-Trioxane). Furthermore, since modification with formaldehyde and its various forms is in the scope of the present invention, it follows also that modification with dialdehydes such as glyoxal, glutaraldehyde, butyraldehyde, etc. is covered here as well. The term "further chemical modification of the lignin" refers to a reaction with a reagent or a catalyst that is not formaldehyde, and includes, but is not be limited by: esterification, sulphonation and epoxidation.

The present inventors found that irrespective what type of lignin is used to prepare the homogeneous liquid, it must have active hydrogens on the lignin macromolecule that can undergo a reaction with formaldehyde to form a methylol group. These active hydrogens are typically on aromatic rings within the lignin structure. Important active hydrogens are those located on the Guaiacyl (G) and p-Hydroxphenyl (H) units, especially the G5, H3 and H5 active hydrogens. The other positions G2, G6, H2 and H6 can be methylolated, though this is highly unfavourable, and if seen, only form as minor constituents.

In an embodiment of the present method for preparing an activated lignin composition the liquid lignin having free active hydrogen positions has a pH range of at least 6, preferably a pH in a range of 6-13, more preferably in a range of 8-12, even more preferably in a range of 9-11. The present inventors found that below pH 6 the reaction of formaldehyde with active hydrogens on lignin to form methylol groups on lignin (i.e. lignin-$CH_2OH$) is too slow. Also at even lower pH's (and assuming it is a lignin that is still soluble at low pH's), an alternative undesired reaction is possible. Namely this is the acidic condensation reaction with formaldehyde. The formaldehyde attacks the active hydrogen positions and because of the acidic conditions a methylene carbo-cation is formed (i.e. lignin=$CH_2^+$) this is highly reactive and immediately forms a methylene bridge to another lignin active hydrogen position, i.e. a condensation reaction. The present inventors also found that at very high pH's the reaction to form the desired methylol groups is very good, however it also aids the condensation of said methylol groups. Consequently, at the later stages of resin condensation, line impregnation and panel pressing, the curing profile is more difficult to control. Also, it introduces unnecessary salt into the product, which will cause an osmotic pressure if it is immersed in water, such that water will want to enter the laminate and cause swelling.

According to the present method for preparing an activated lignin composition the temperature according to step ii) is in a range of 60° C.-85° C., preferably in a range of 65° C.-80° C. These temperature ranges are to optimise the methylolation reaction over that of the condensation reaction. Consequently the liquid lignin needs to be adjusted to this optimal temperature range prior to the addition of the formaldehyde. If it were too high then condensation would occur whilst the formaldehyde is being added. At temperatures below 60° C. there is little reaction.

According to the present method for preparing an activated lignin composition the temperature according to step iv) is in a range of 60° C.-85° C., preferably in a range of 65° C.-80° C. These temperature ranges are to optimise the methylolation reaction over that of the condensation reaction.

The period of time according to step iv) in an embodiment of the present method for preparing an activated lignin composition is in a range of 15 minutes-4 hours, preferably in the range 30 minutes to 2 hours. The present inventors found that a reaction time less than 10 minutes is unlikely to give sufficient activation, whereas more than 4 hours is not commercially sensible.

In an embodiment of the present method for preparing an activated lignin composition the addition of formaldehyde to the heated liquid lignin is carried out on a continuous base. The present inventors found that such a dose regime offers improved control over the reaction. In addition, it helps to avoid overheating to a temperature range wherein the condensation becomes significant. In another embodiment the formaldehyde can be dosed in one or more charges.

The present inventors found that the amount of formaldehyde added to the heated liquid lignin is in a range suitable for reacting with the lignin based upon the mass of dry lignin that the mixture contains and more specifically, the moles of active hydrogen sites that the said lignin contains. In the present method the formaldehyde is added in a stoichiometric excess i.e. >1:1—so as to aid the reaction kinetics and to optionally provide a certain amount of pre-dosing of formaldehyde prior to the phenol addition. The term "stoichiometric excess ratio of >1:1" means relative to the lignin's free active hydrogen positions.

The processing steps according to the present invention result in an activated lignin. The present inventors found that it only marginally increases in molecular weight, but that it does indeed consume significant formaldehyde. 2D NMR studies have shown marked decreases in the G5, H3 and H5 signals and the appearance of strong signals related to —CH$_2$OH (i.e. the methylol functionality from the reaction, lignin+formaldehyde).The present inventors found that activated liquid lignin obtained according to the present process step is well functionalised to react into a 3D polymer network together with phenol formaldehyde oligomers.

The present invention also relates to a method for preparing an intermediate type of lignin-phenol formaldehyde resin comprising the following steps:
a) providing an activated lignin composition obtained according to present method as disclosed herein;
b) optionally heating said activated lignin composition of step a) to a temperature in a range of 50° C.-90° C., preferably in a range of 50° C.-85° C.;
c) adding phenol to said activated lignin composition;
d) adjusting the temperature of the mixture of step c) such that it is in the range of 60° C.-90° C., preferably in a range of 60° C.-85° C.;
e) adding formaldehyde to said mixture of step d).

The aim of this method for preparing an intermediate type of lignin-phenol formaldehyde resin is to enable a low molecular weight lignin phenol formaldehyde resin with good impregnation properties and low free monomers, i.e. low free formaldehyde and low free phenol, to be made. For the preparation of the lignin-phenol formaldehyde resin as such one or more additional process steps of, inter alia, are needed, e.g. methylolation step, condensation step, dilution step and addition of additives. Please note that the present invention also relates to a situation wherein the method for preparing an activated lignin composition could be carried out at one facility and transported to another for resin synthesis. Thus the method for preparing an activated lignin composition and the method for preparing a lignin-phenol formaldehyde resin can be carried out at different locations and/or by different firms.

It follows that in a potential embodiment of the present method for preparing an intermediate type of lignin-phenol formaldehyde resin, step c) uses a phenol solution, which has a lower freezing point than pure phenol. Therefore the lower boundary of the temperature range in step b) could be lowered in accordance or even eliminated for practical purposes. This may be of use if the activated lignin in step a) has come from storage or via transport and is at a lower temperature.

The step of heating is optional. This means that the present method for preparing an intermediate type of lignin-phenol formaldehyde resin can be carried out by combining the present activated lignin composition and phenol and adjusting the temperature of the mixture such that it is in the range of 60° C.-90° C., preferably at an upper temperature range of 85° C. Thus the starting materials may be at room temperature. According to another embodiment the present activated lignin composition is heated to a temperature in a range of 50° C.-90° C., preferably at an upper temperature range of 85° C., and phenol is added to the heated activated lignin composition. After mixing the temperature of the mixture is adjusted such that it is in the range of 60° C.-90° C., preferably at an upper temperature range of 85° C.

In an embodiment of the present method for preparing an intermediate type of a lignin-phenol formaldehyde resin, step b) and d) is carried out in a temperature in a range of 65-80° C.

In another embodiment of the present method for preparing an intermediate type of a lignin-phenol formaldehyde resin, the addition of formaldehyde according to step e) is carried out on a continuous base. The formaldehyde can also be charged in one or in several doses, but is preferred to dose continuously for reasons of temperature control. Furthermore with the good temperature control made possible by continuous dosing, it is possible to keep the batch in a temperature range that favours the phenol formaldehyde methylolation reaction over that of the phenol formaldehyde condensation reaction; thus helping to keep the molecular weight distribution of the resin components low.

In an embodiment of the present method for preparing an intermediate type of a lignin-phenol formaldehyde resin the addition of formaldehyde according to step e) takes place in a period of time between 20 and 150 minutes, preferably 30 minutes and 90 minutes.

In an embodiment of the present method for preparing an intermediate type of a lignin-phenol formaldehyde resin, the temperature during step e) is maintained in a range of 60° C.-90° C., preferably 65-80° C., even more preferably at an upper temperature range of 85° C. The present inventors found that this temperature range favours the methylolation reaction and not the condensation reaction.

In an embodiment of the present method for preparing an intermediate type of lignin-phenol formaldehyde resin the amount of formaldehyde added according to step e) is related to the amount of phenol added according to step c) and the amount of residual free formaldehyde in the activated lignin.

The combination of the amount of formaldehyde added in step e) together with the amount of formaldehyde residual in the activated lignin should give, when compared with the amount of phenol charged in step c), a molar ratio P:F in the range of 1.0:0.9-2.0, preferably in a range of 1.0:1.0-1.5.

In an embodiment of the present method for preparing a lignin-phenol formaldehyde resin an additional step f) is optionally carried out, said step f) being carried out after step e). Thus the material obtained after step e) is further processed in a step f), i.e. a step f) that, according to the present invention, can be identified as methylolation. The methylolation step comprises heating and maintaining the mixture of step e) at a temperature in a range 50-80° C., more preferably in a range of 60-80° C. and most preferably 65° C.-80° C. during a period of time of at least 10 minutes, but preferably of at least 30 minutes. The present inventors found that according to an embodiment some condensation can take place in the high temperature range of the methylolation step resulting in the final lignin-phenol formaldehyde resin. The product thus obtained can be diluted with solvent and one or more additives, if necessary. The advantage of the methylolation stage (batch temperature held between 50° C. and 80° C., preferably between 60° C. and 80° C.) is that the methylolation reaction is favoured over the condensation reaction, this leads to a lower free formaldehyde and lower free phenol for a given degree of condensation later on. The length of time for the methylolation stage can be subject to the particular requirements of the resin. The present inventors found that the methylolation stage should be at least 10 minutes, but preferably of at least 30 minutes, and more preferably between 40 minutes and 120 minutes, and even more preferably between 40 minutes and 70 minutes.

In another embodiment of the present method for preparing a lignin-phenol formaldehyde resin an additional step g) is optionally carried out, said step g) being carried out after step e). Thus the material obtained after step e) is further processed in a step g), i.e. a step g) that, according to the present invention, can be identified as condensation. This condensation stage should be at temperatures over 80° C., preferably in the range of 85° to 95° C. In the situation of step e) being followed by step g) no methylolation step f) is carried out, i.e. the step of adding formaldehyde to the mixture of step d) is directly followed by condensation. The product thus obtained can be diluted with solvent and one or more additives, if necessary.

In another embodiment of the present method for preparing a lignin-phenol formaldehyde resin step e) is followed by step f) and step f) is followed by step g). This means that the step of adding formaldehyde to the mixture of step d) is followed by methylolation, and methylolation is followed by condensation. The temperature ranges as mentioned above for both the methylolation and condensation apply here as well. This means that the methylolation step is carried out at a temperature in a range 50° C.-80° C., preferably 60° C.-80° C., and most preferably 65° C.-80° C. during a period of time of at least 10 minutes but preferably of at least 30 minutes, and more preferably between 40 minutes and 120 minutes, and even more preferably between 40 minutes and 70 minutes; and that the condensation step is carried out at temperatures over 80° C., but preferably in the range of 85° C. to 95° C. The lignin phenol formaldehyde resin product thus obtained can be diluted with solvent and one or more additives, if necessary.

The condensation stage [step g)] allows the resin to advance further in molecular weight as a polymer, which may aid classification of the resin as a polymer, or to reach required free monomer concentration specifications.

Dilution with a solvent, and optionally also with additional water, can reduce the viscosity, and also the surface tension, of the resin. This can enable a better impregnation of paper by the resin; the resin up-take of the paper is mainly driven by the capillary action capabilities of the paper.

From the view of flash point and flammability the solvent used to dilute the resin should be added safely to the batch. In addition, the methylolation and condensation reactions of the resin should not progress any further, therefore the batch temperature for mixing and homogenizing the batch with the solvent following its addition is preferably below 50° C., more preferably in the temperature range of 20° C. to 50° C. The solvent charge may be used as a means to cool the batch following the desired resin synthesis step, perhaps in addition to other measures such as cooling coils.

In the dilution phase the solvent can be dosed in one charge. The amount of solvent to be charged is between 2 wt. % and 15 wt. %, but preferably between 4 wt. % and 12 wt. %, and more preferably between 6 wt. % and 10 wt. %, based on the total weight of the resin.

The viscosity range is preferably between 3 mPa·s and 50 mPa·s, more preferably between 5 and 30 mPa·s, and even more preferably between 5 and 20 mPa·s.

In an embodiment the solvent comprises molecules having an alcohol group (i.e. R—OH), such as methanol, ethanol, propanol, isopropanol, butanol, iso-butanol, pentanol, iso-pentanol, plus higher alcohols and their isomers. Furthermore diols such as mono ethylene glycol, triols such as glycerol, or glycol ethers such as diethylene glycol can be used. If for example methanol is used, it should be charged to the resin batch at temperatures below 40° C. Optionally, if the flashpoint of the solvent is high enough, or the facilities can safely handle the hazards, the solvent can be added at the liquid lignin preparation, lignin activation, or resin synthesis steps.

In an embodiment, an additive or additive mixture is added to the resin, for example after dilution with solvent as discussed above, or this can be dosed into the resin batch just before impregnation. A possible aim of the additive addition is to ensure a good wettability of the paper, i.e. enabling a good impregnating of the resin into the paper. Alternatively it may assist with foaming issues on the impregnation line. The additive may also serve to provide modified flow properties and plasticize the resin on final curing and pressing.

In an embodiment, the resin temperature during dosing of the additive or additive mixture is preferably in a range of 20° C. to 50° C., more preferably a temperature between 25° C. and 35° C.

In an embodiment the additive or additive mixture is dosed in one charge. The amount of additive or additive mixture to be charged is between 0.0 wt. % and 5 wt. %, preferably between 0.5 wt % and 4 wt %, and more preferably between 1.5 wt. % and 2.5 wt. %, based on the resin.

As discussed before the resin up-take of the paper is mainly driven by the capillary action capabilities of the paper. The additive or additive mixture lowers the surface tension (or interfacial tension) between a liquid and a solid thereby promoting a better transfer of resin into the paper.

The resin mixture obtained according to the present invention will be used to impregnate an impregnation paper. This paper has a basis weight of preferably between 100 $g/m^2$ and 250 $g/m^2$, more preferably between 128 $g/m^2$ and 215 $g/m^2$. The average moisture percentage of impregnation papers is in a range of 2.5 to 5 wt %.

The present invention furthermore relates to the use of the above-described resin mixture which is used to impregnate an impregnation paper. The so called semi-finished material will be composed into a stacked package and used in a pressing operation to form laminates. The pressing operation will be carried out using an elevated temperature and an elevated pressure. In an embodiment at least on one side of the stacked package a decorative layer is provided prior to or after the pressing operation.

The present invention is also suitable for the production of CPL ("Continuous Pressure Laminates" or alternatively "Continuous Pressed Laminates"). In the past CPL lines were run with pressure in the range of 20-50 bar, but modern CPL lines are capable of achieving pressures in the range of 70-80 bar. Hence from a "pressure" point of view there is no difference to the multi daylight presses which are also typically referred as HPL (High Pressure Laminate) presses. The present invention also covers the Double Belt Press (DBP) for the production of CPL. CPL typically has decorative paper impregnated with resins, which is fused under heat and high pressure with resin impregnated backer(s).

Laminate properties are similar to standard HPL and a typical thickness range is between 0.4 mm to 1 mm. Flexible CPL is decorative paper impregnated with flexible thermosetting resins and fused under heat and high pressure with resin-impregnated backer(s). During the step of bonding together the individual components, i.e. the core layer, and the decor layer, with simultaneous application of heat, for example ≥120° C., and high specific pressure (>7 MPa) a homogeneous non-porous panel with increased density and integral decorative surface is obtained.

In order to have a good end product, meaning a HPL or CPL, a homogeneous and full resin penetration into the paper is preferred. Therefore the altering of the physical properties of the paper might be needed. Also additives may be used to enhance the resin penetration into the paper. All papers can be used for impregnation with the resin obtained according to the present invention. For HPL and CPL applications saturation base Kraft paper is preferably used.

A stationary press, possibly a multi daylight press, is used for pressing and suitably curing the impregnation paper impregnated with the present resin mixture into laminate products. In another embodiment a continuous press is used for such a pressing operation.

The laminates thus obtained preferably have a thickness varying from 0.2 mm to 50 mm, but in particular from 0.5 mm to 25 mm.

The laminates obtained according to the present invention can be used indoors as well as outdoors. The application in the construction area relates to the cladding of buildings, for example interior walls, exterior walls, ceilings and facades. The indoor application relates to the manufacturing of furniture, worktops and table tops, storage compartments such as lockers and various other products. Examples of furniture are table tops, laboratory tables, kitchen work tops, nightstands, hot plates, countertops, benches, chairs, or stools, as well as tables, such as coffee tables, dining tables, cocktail tables, conference tables, side tables, picnic tables, or outdoor tables.

BRIEF DESCRIPTION OF THE DRAWINGS

The present invention is further described in the following examples, together with the appended figures, which do not limit the scope of the invention in any way. Preferred features of each aspect of the invention are as for each of the other aspects mutatis mutandis. Embodiments of the present invention are described as mentioned in more detail with the aid of examples of embodiments, together with the appended figures, the only purpose of which is to illustrate the invention and are in no way intended to limit its extent.

DETAILED DESCRIPTION

Figure 1:
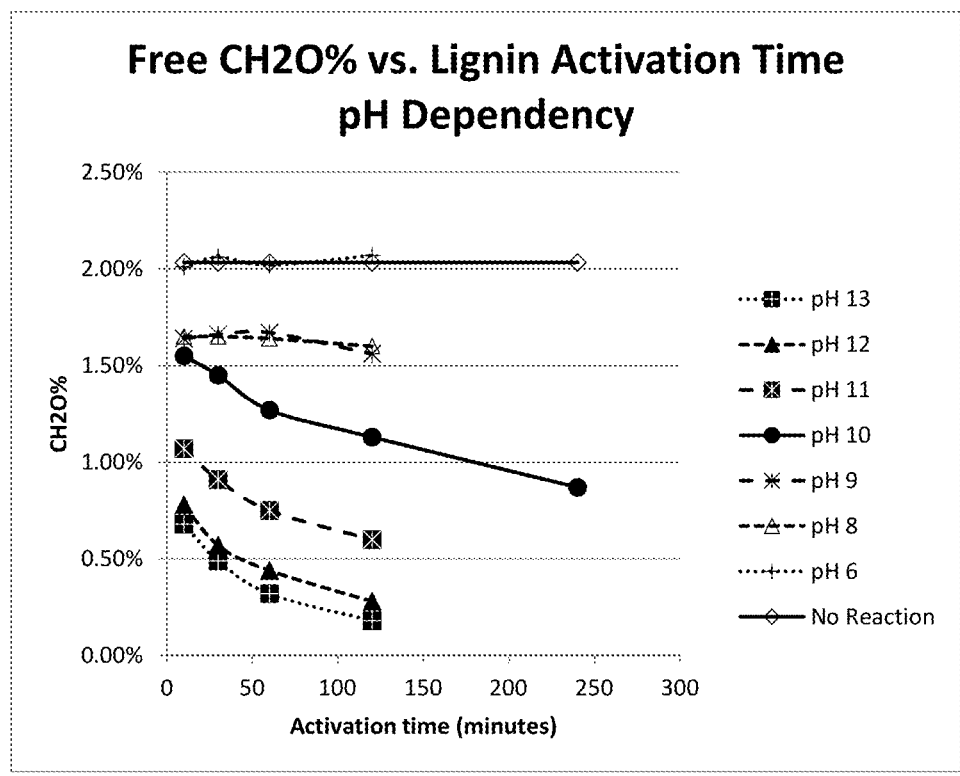
FIG. 1 is a graph illustrating lignin activation with variation in pH.

The present invention also relates to a method for manufacturing a laminate comprising of preparing a core layer and pressing said core layer in a press using an elevated temperature and an elevated pressure, wherein a resin mixture comprising a lignin-phenol formaldehyde resin obtained according to the method according to the present invention as discussed above is used for impregnating said core layer.

In an embodiment of the present method for manufacturing a laminate the core layer comprises of one or more prepregs made of wood fibres.

In an embodiment of the present method for manufacturing a laminate the core layer comprises of a stack of resin impregnated papers, wherein said papers are preferably made with saturation base kraft papers.

In an embodiment of the present method for manufacturing a laminate the core layer comprises of a combination of prepregs and impregnated papers, wherein said prepregs are preferably made of wood fibres and wherein the impregnated papers are preferably made with saturation base kraft papers.

In an embodiment the impregnated papers are positioned as an outer-layer of the core-material, whilst having prepreg(s) in the middle.

In another embodiment the prepregs and impregnated papers are interlaced, preferably in such a way that said impregnated papers are positioned between said prepregs, wherein said impregnated papers are optionally positioned as an outer-layer of the core-material.

In another embodiment the core layer is combined with one or more decorative layers, wherein said decorative layer is positioned on one side or on both side of core-layers.

In another embodiment one or more decorative layers are based on decorative paper saturated using thermosetting resin like melamine-formaldehyde resin.

In another embodiment one or more decorative layers are coated using acrylic resin hardened using either UV-curable or EB-curable system.

Method for Viscosity Measurements

In the examples a Brookfield LVT was used to measure the viscosity. Once the temperature of the samples had been adjusted to 20° C., their viscosities' were measured using the appropriate spindle and rpm settings.

Method for pH determination

Samples were adjusted to 20° C. and their pH was measured by inserting a calibrated pH electrode/meter.

Method for free formaldehyde determination (HPLC)

The sample was accurately weighed out (200 mg) into a 50 ml volumetric flask and made up to the mark with methanol. Once dissolved and a homogeneous solution is formed, 2 ml are then pipette to a second 50 ml volumetric flask. This was then approximately half filled with distilled water and 2 ml of DNPH (2,4-dinitrophenolhydrazine) solution were then added. It was then filled to the mark with more distilled water and homogenised. The DNPH reacts with formaldehyde to form a derivative that is chromophoric. A small amount (circa 4 ml) is removed and passed through a 0.2 μm filter before being readied for injection onto the HPLC column. (NB: the first 2 ml of filtrate or so go to waste, whilst the remainder goes into a sample vial that is loaded onto the HPLC carousel).

The HPLC used a waters Nova-Pak C18, 4 μm 3.9×20 mm pre-column, and a waters Nova-Pak C18, 4 μm 4.6×150 mm main-column. The eluent was isocratic, 70% methanol: 30% aqueous sodium formate buffer pH 4.5. The aqueous buffer consists of 4.3 g of sodium hydroxide plus 4.75 ml of formic acid in 2.5 litres of HPLC grade water. Both the methanol and the pH 4.5 aqueous buffer were degassed before being used as an eluent. After running the samples, the chromatograms were then evaluated and the free formaldehyde of the sample was then calculated. For each sample the determination is done twice. Note standards with formaldehyde and DNPH were also prepared and run for calibration purposes.

Method for Free Phenol Determination

The sample was accurately weighed out (200 mg) into a 50 ml volumetric flask and made up to the mark with methanol. Once dissolved and a homogeneous solution is formed, a small amount (circa 4 ml) is removed and passed through a 0.2 μm filter before being readied for injection onto the HPLC column. (NB: the first 2 ml of filtrate or so go to waste, whilst the remainder goes into a sample vial that is loaded onto the HPLC carousel). The HPLC used a waters Nova-Pak C18, 4 μm 3.9×20 mm pre-column, and a waters Nova-Pak C18, 4 μm 4.6×150 mm main-column. The elution program was as described in Table 1.

TABLE 1

Elution program for free phenol determination

| Retention Time (min) | methanol | aqueous sodium formate buffer pH 4.5 | Type of elution |
|---|---|---|---|
| 0 to 5 | 7% | 93% | Isocratic |
| 5 to 30 | 100% | 0% | Gradient |
| 30 to 40 | 100% | 0% | Isocratic |
| 40 to 50 | 7% | 93% | Gradient |

The aqueous buffer consists of 4.3 g of sodium hydroxide plus 4.75 ml of formic acid in 2.5 litres of HPLC grade water. Both the methanol and the pH 4.5 aqueous buffer were degassed before being used as an eluent. After running the samples, the chromatograms were then evaluated and the free phenol of the sample was then calculated. For each sample the determination is done twice. Note standards with phenol were also prepared and run for calibration purposes.

Method for SEC Analysis

The SEC measurements were performed in 0.1 M NaOH eluent using PSS MCX 1000 & 100000 Å columns with a precolumn. The samples were diluted with 0.1 M NaOH solution and filtered (0.45 μm) prior to measurement. Molar mass distributions were calculated with the use of polystyrene sulphonate standards. A photo diode array set at 280 nm was used as the detector.

Method for 2D HSQC NMR

Samples were freeze dried and then dissolved in $D_2O$ (90 mg/ml). 2D (1H-13C) HSQC NMR measurements were performed using a Bruker Avarice III 600 MHz with double resonance and QCI cryoprobe. To evaluate the extent of methylolation (—$CH_2OH$) during lignin activation, the signal intensities were normalized relative to the signal from the lignin methoxy (MeO—) groups.

Examples 4 to 10 (Kraft Lignin Activation: Variance with pH)

A 3000 ml glass reactor configured for reflux under atmospheric conditions was used. It also had an electric motor and anchor stirrer that was set to a stirring rate of 400 rpm. Furthermore the reactor was double walled, so that heating could be provided by a recirculating thermostatically controlled oil bath. The reactor also had cooling coils through which cold water could pass. This arrangement allowed good control of the experiment's temperature.

To this reactor materials were added; and specifically for the Kraft Lignin Activation Examples 4-10, the materials and quantities are listed in Tables 2 and 3.

Note, the data shown in Table 2 are to be regarded as raw materials for present step i), namely providing a liquid lignin having free active hydrogen positions.

TABLE 2

Preparation of liquid lignin

Step 1: Liquid Lignin Preparation

| | Example | 4 | 5 | 6 | 7 | 8 | 9 | 10 |
|---|---|---|---|---|---|---|---|---|
| | Target pH | 10.0 | 9.0 | 11.0 | 8.0 | 12.0 | 6.0 | 13.0 |
| | Raw Material | | | | | | | |
| A | Demineralised water [1] | 1207.68 | 1243.60 | 1207.68 | 1243.68 | 1207.68 | 1267.68 | 1207.68 |
| B | KOH 47% [1] | 76.00 | 40.00 | 76.00 | 40.00 | 76.00 | 16.00 | 76.00 |
| C | Kraft Lignin 67.22% | 565.32 | 565.32 | 565.32 | 565.32 | 565.32 | 565.32 | 565.32 |
| D | KOH 47% [2] | 0.00 | 7.28 | 34.39 | 2.03 | 83.87 | 0.00 | 120.10 |
| E | Demineralised water [2] | 151.00 | 143.72 | 116.61 | 148.97 | 67.13 | 151.00 | 30.90 |

TABLE 3 lignin activation

Step 2: Lignin Activation

| | Example | 4 | 5 | 6 | 7 | 8 | 9 | 10 |
|---|---|---|---|---|---|---|---|---|
| | Target pH | 10.0 | 9.0 | 11.0 | 8.0 | 12.0 | 6.0 | 13.0 |
| | Raw Material | | | | | | | |
| | Liquid Lignin (after removal of retained sample) | 1907.82 | 1886.05 | 1890.04 | 1881.60 | 1897.38 | 1894.40 | 1908.53 |
| F | Formalin 55% | 73.23 | 72.40 | 72.55 | 72.22 | 72.83 | 72.72 | 73.26 |

The following procedure was used for Examples 4-10. To the reactor, (A) demineralised water [1] and (B) KOH 47% [1] were charged. The temperature was then adjusted to 75° C., where upon (C) the kraft lignin powder was charged. This was allowed to dissolve over 1 hr at 75° C. A 100 g sample is then taken, weighed and cooled to 20° C. in an ice bath. For each example there is a target pH, these are indicated in Table 2. The pH of the sample is measured, and if necessary the pH is adjusted by the dropwise addition of KOH 47% under stirring—the amount of KOH 47% needed for this is noted and used to calculate the amounts for materials (D) KOH 47% [2] and (E) demineralised water [2]. The adjusted sample is returned to the reactor and materials (D) and (E) are then charged. The mixture is allowed to stir at 75° C. for a further 1 hr.

Note, the calculations of weights for (D) and (E) are as follows:

KOH 47%[2]=(KOH 47% to adjust sample pH)/(sample)*((water[1])+(KOH[1])+(Kraft Lignin)−(sample))   (D)

water[2]=2000−((water[1])+(KOH[1])+(Kraft Lignin)+(KOH[2]))   (E)

The temperature of the experimental example was then adjusted to 75° C. (F) Formalin 55% is then charged to the reactor, and a timer is started. Note the formalin charge is based on 96.3% liquid lignin preparation and 3.7% formalin 55%. The temperature is maintained for 4 hr and samples are taken at 10 min, 30 min, 60 min, 120 min, and 240 min—for further characterisation and analysis. These analyses and their results will discussed hereafter.

Examples 11 to 15 (Kraft Lignin Activation: Variance in Temperature)

Examples 11 to 15, are in line with the experimental procedures of Example 4 but with different hold temperatures for the $2^{nd}$ step—lignin activation.

Step 1—the liquid lignin preparation is performed as in Example 4, with a target pH of 10. The temperature is then adjusted to that specified in Table 4 and a retained "liquid lignin sample" is taken. The formalin charge (F) is then calculated and dosed to the reactor; again this is based on 96.3% liquid lignin preparation and 3.7% formalin 55%. Once charged, a timer is started, the specified temperature maintained, and samples taken at 10 min, 30 min, 60 min, 120 min, and 240 min. The samples were further characterised and analysed. These analyses and their results will discussed hereafter.

TABLE 4

Lignin activation temperatures for examples 11 to 15
Step 2: Lignin Activation

| Example | 11 | 12 | 13 | 14 | 15 |
|---|---|---|---|---|---|
| Target lignin activation temperature | 98° C. | 85° C. | 70° C. | 65° C. | 60° C. |
| Target pH | 10.0 | 10.0 | 10.0 | 10.0 | 10.0 |

Examples 16 and 17 (Lignosulphonate Activation)

The experimental procedures in Example 16 are similar to those mentioned in Example 4 but with the kraft lignin substituted by sodium Lignosulphonate. Example 17 is a repeat of 16, but without the KOH addition; thus giving an example with lower pH. For both, the same reactor and experimental steps were used as in the previous examples. The materials used are specified in Tables 5 and 6.

TABLE 5

Raw materials for Step 1 - liquid lignin preparation
Step 1: Liquid Lignin Preparation

| | Example | 16 | 17 |
|---|---|---|---|
| | Target pH | 10.0 | 8.4 |
| | Raw Material | | |
| A | Demineralised water [1] | 1360.67 | 1360.67 |
| B | KOH 47% [1] | 0.00 | 0.00 |
| C | Sodium lignosulphonate 92.16% | 412.33 | 412.33 |
| D | KOH 47% [2] | 7.34 | 0.00 |
| E | Demineralised water [2] | 219.66 | 227.00 |

TABLE 6

Raw materials for Step 2 - lignin activation
Step 2: Lignin Activation

| | Example | 16 | 17 |
|---|---|---|---|
| | Target pH | 10.0 | 9.0 |
| | Raw Material | | |
| | Liquid Lignin (after removal of retained sample) | 1874.32 | 1851.14 |
| F | Formalin 55% | 71.94 | 71.05 |

The following procedure was used for Example 16. To the reactor, (A) demineralised water [1] is charged. The temperature was then adjusted to 75° C., where upon (C) the sodium lignosulphonate powder was charged. This was allowed to dissolve over 1 hr at 75° C. A 100 g sample was then taken, weighed and cooled to 20° C. in an ice bath. The pH of the sample was measured, and then adjusted by the dropwise addition of KOH 47% under stirring—the amount of KOH 47% needed for this was noted and used to calculate the amounts for materials (D) KOH 47% [2] and (E) demineralised water [2]. The adjusted sample was returned to the reactor and materials (D) and (E) were then charged. The mixture was then allowed to stir at 75° C. for a further 1 hr.

At 75° C., (F) Formalin 55% was then charged to the reactor, and a timer is started. Note the formalin charge is based on 96.3% step 1 liquid lignin preparation and 3.7% formalin 55%. The temperature is maintained for 4 hr and samples are taken at 10 min, 30 min, 60 min, 120 min, and 240 min. The samples were further characterised and analysed. These analyses and their results will discussed hereafter.

For Example 17, no KOH was added. Since sodium lignosulphonate is soluble in water its natural pH was taken for the experiment—this happened to be 8.4.

Example 18 (Kraft Lignin Activation: Variance in Formalin)

In the previous Examples, the formalin dosing had been based on 1 g of formaldehyde (100%) for 9 g of dry lignin. In Example 18, a lower formaldehyde dosing is used; namely 1 g of formaldehyde (100%) for 12 g of dry lignin. In other respects it is like Example 4. See Tables 7 and 8 for weights of materials used.

TABLE 7

Raw materials for Step 1 - liquid lignin preparation
Step 1: Liquid Lignin Preparation

| | Example | 18 |
|---|---|---|
| | Target pH | 10.0 |
| | Raw Material | |
| A | Demineralised water [1] | 1207.68 |
| B | KOH 47% [1] | 76.00 |
| C | Kraft Lignin 67.22% | 565.324 |
| D | KOH 47% [2] | 0.0 |
| E | Demineralised water [2] | 151.00 |

TABLE 8

Raw materials for Step 2 - lignin activation
Step 2: Lignin Activation

| | Example | 18 |
|---|---|---|
| | Target pH | 10.0 |
| | Raw Material | |
| | Liquid Lignin | 1907.82 |
| | (after removal of retained sample) | |
| F | Formalin 55% | 54.92 |

Again samples were taken at 10 min, 30 min, 60 min, 120 min and 240 min. The samples were further characterised and analysed. These analyses and their results will discussed hereafter.

Example 20 (Lignin Phenol Formaldehyde Resin: No Lignin Activation and No Phenol Methylolation Step)

To a 3000 ml reactor were charged; demineralised water 1207.68 g, KOH 47% 76.00 g, and Antifoam agent 4.00 g. The reactor was configured for atmospheric reflux and the stirrer set at 400 rpm. The batch was then adjusted to 75° C. Once 75° C. was reached, kraft lignin powder 565.32 g were charged to the reactor and allowed to dissolve over 1 hr at 75° C. A 100 g sample was then taken and cooled to 20° C. to check the quality of the dissolution and the pH (target=10). Note: If necessary the sample pH is adjusted and from this the amount of KOH required for adjustment of the rest of the batch is calculated. In this experiment no further adjustment was necessary and the sample was simply returned to the batch.

A second charge of demineralised water 147 g was then charged to the reactor, and the temperature readjusted to 75° C. The batch was then held for a further 1 hr, after which time a 92.34 g sample, "liquid lignin retained sample" was taken. This meant that 1907.66 g of liquid lignin remained in the reactor. The lignin phenol formaldehyde resin example is intended to have a 50:50 lignin:phenol content, and 1 g formaldehyde for every 9 g of lignin. Additionally the phenol will also require further formaldehyde for cross linking—specifically in this example at molar ratio of F/P=0.9.

After performing the necessary calculations, 362.46 g of phenol 100% are charged to the reactor, followed by 262.86 g of formaldehyde 55%. The batch was then heated to 90° C. (via exothermal and oil jacket heating) for the condensation reaction to take place; samples were taken at regular time intervals after reaching 90° C.—every 10 minutes—until a total condensation time of 80 minutes was reached. The batch was then cooled and discharged from the reactor.

Example 21 (Lignin Phenol Formaldehyde Resin: with Lignin Activation, but No Phenol Methylolation Step)

To a 3000 ml reactor were charged; demineralised water 1207.68 g, KOH 47% 76.00 g, and Antifoam agent 4.00 g. The reactor is configured for atmospheric reflux and the stirrer set at 400 rpm. The batch was then adjusted to 75° C. Once 75° C. was reached, kraft lignin powder 565.32 g was charged to the reactor and allowed to dissolve over 1 hr at 75° C. A 100 g sample was then taken and cooled to 20° C. to check the quality of the dissolution and the pH (target=10). Note: If necessary the sample pH is adjusted, and from this the amount of KOH required for adjustment of the rest of the batch is calculated. In this experiment no further adjustment was necessary and the sample was simply returned to the batch.

A second charge of demineralised water 147 g was then charged to the reactor, and the temperature readjusted to 75° C. The batch was then held for a further 1 hr, after which time a 123.93 g sample, "liquid lignin retained sample" was taken. This meant that 1876.07 g of liquid lignin remained in the reactor. The lignin phenol formaldehyde resin example is intended to have a 50:50 lignin:phenol content, and 1 g formaldehyde for every 9 g of lignin. Additionally the phenol will also require further formaldehyde for cross linking—specifically in this example at molar ratio of F/P=0.9.

After performing the necessary calculations, 72.01 g of formaldehyde 55% were charged to the reactor (this equates to 1 g CH2O for every 9 g of lignin). The batch was then held at 75° C. for 1 hr—this being the lignin activation step.

After the lignin activation, 356.46 g of phenol 100% was charged to the reactor. A second charge of formaldehyde 55% (note—molar ratio F/P=0.9) 186.50 g was then made to the reactor. After which the batch was heated to 90° C. (via exothermal and oil jacket heating) for the condensation reaction to take place. Samples were taken at regular time intervals after reaching 90° C.—every 10 minutes—until a total condensation time of 80 minutes was reached. The batch was then cooled and discharged from the reactor.

Example 22 (Lignin Phenol Formaldehyde Resin: with Lignin Activation and Phenol Methylolation Steps)

To a 3000 ml reactor were charged; demineralised water 1207.68 g, KOH 47% 76.00 g, and Antifoam agent 4.00 g were charged. The reactor is configured for atmospheric reflux and the stirrer set at 400 rpm. The batch was then adjusted to 75° C.

Once 75° C. was reached, kraft lignin powder 565.32 g was charged to the reactor and allowed to dissolve over 1 hr at 75° C. A 100 g sample was then taken and cooled to 20° C. to check the quality of the dissolution and the pH (target=10). Note: If necessary the sample pH is adjusted, and from this the amount of KOH required for adjustment of the rest of the batch is calculated. In this experiment no further adjustment was necessary and the sample was simply returned to the batch.

A second charge of demineralised water 147 g was then charged to the reactor, and the temperature readjusted to 75° C. The batch was then held for a further 1 hr, after which time a 100.00 g sample, "liquid lignin retained sample" was taken. This meant that 1900.00 g of liquid lignin remained in the reactor. The lignin phenol formaldehyde resin example is intended to have a 50:50 lignin:phenol content, and 1 g formaldehyde for every 9 g of lignin. Additionally the phenol will also require further formaldehyde for cross linking—specifically in this example at molar ratio of F/P=0.9. After performing the necessary calculations, 72.93 g of formaldehyde 55% were charged to the reactor (this equates to 1 g CH2O for every 9 g of lignin). The batch was then held at 75° C. for 1 hr—this being the lignin activation step.

After the lignin activation, 361.01 g of phenol 100% was charged to the reactor and the temperature brought back to 75° C. A second charge of formaldehyde 55% (note—molar ratio F/P=0.9) 188.88 g was then made to the reactor, but this time via a peristaltic pump—so as to allow dosing over a time period of 60 minutes whilst maintaining a batch temperature of 75° C. Once the formaldehyde had be dosed, the batch was held at 75° C. for a further 60 min—this was the methylolation step.

After the methylolation step, the batch was sampled (i.e. "End of Methylolation Step") and then heated to 90° C. and held there for the condensation step. The batch was sampled at the beginning of the condensation and then again every ten minutes, until a total condensation time of 80 minutes had elapsed. The batch was then cooled and discharged from the reactor.

Examples 23 and 24—Manufacturing of HPL Compact Panels 6 mm

Based on the principles and processing described in this patent, and the proof given by the earlier examples, a Lignin Formaldehyde Resin (LPF) recipe was developed using both the described "lignin activation step" and the "phenol methylolation step". The recipe contained equal parts kraft lignin and phenol by weight (i.e. one could say that 50% of the phenol had been replaced with lignin). An alkali hydroxide was used as a catalyst. This LPF resin was Example 23.

The same recipe was repeated, but without the "lignin activation step" and without "the phenol methylolation" step. In effect all ingredients were charged and the batch was taken to the condensation phase. This was Example 24.

Examples 23 and 24 are analogous to Examples 22 (10 minutes condensation) and 20 (30 minutes condensation) respectively, but with proprietary recipe details. They therefore had similar free phenol and free formaldehyde.

Examples 23 and 24 were used to impregnate kraft paper, using an impregnation line facility, to give comparable nominal target grammages and volatiles. These impregnated papers were then used to make 6 mm thick HPL compact panels using a laboratory press and our normal proprietary press cycle.

The Table 9: below provides an overview of the Examples; 4-18, & 20-22.

TABLE 9 an overview of the laboratory examples and the samples taken.

| Example number | Example type | Target pH | Target T°C | CH2O(g)/Lignin(g) | pH | Viscosity {cP} | Free-Formaldehyde (% wt.) - HPLC | Free-Formaldehyde if no reaction (% wt.)- Calc. | Additional Comments |
|---|---|---|---|---|---|---|---|---|---|
| 4 | Lignin Activation: Kraft lignin | 10.0 | 75.0 | 1/9 | — | — | — | — | Mw Dist. (SEC) and NMR (2D HSQC) on samples; Liquid Lignin, 60 min Activation, and 120 min Activation |
|  | Liquid lignin |  |  |  | 10.07 | 18.6 | <0.05% | 0.00% |  |
|  | 10 min. activation |  |  |  | 9.90 | 19.2 | 1.55% | 2.03% |  |
|  | 30 min. activation |  |  |  | 9.85 | 18.6 | 1.45% | 2.03% |  |
|  | 60 min. activation |  |  |  | 9.82 | 20.4 | 1.27% | 2.03% |  |
|  | 120 min. activation |  |  |  | 9.70 | 24.0 | 1.13% | 2.03% |  |
|  | 240 min. activation |  |  |  | 9.46 | 46.8 | 0.87% | 2.03% |  |
| 5 | Lignin Activation: Kraft lignin | 9.0 | 75.0 | 1/9 | — | — | — | — |  |
|  | Liquid lignin |  |  |  | 8.60 | 13.8 | <0.05% | 0.00% |  |
|  | 10 min. activation |  |  |  | 8.46 | 13.2 | 1.64% | 2.03% |  |
|  | 30 min. activation |  |  |  | 8.38 | 13.8 | 1.66% | 2.03% |  |
|  | 60 min. activation |  |  |  | 8.37 | 13.8 | 1.67% | 2.03% |  |
|  | 120 min. activation |  |  |  | 8.23 | 13.2 | 1.56% | 2.03% |  |
|  | 240 min. activation |  |  |  |  |  |  |  |  |
| 6 | Lignin Activation: Kraft lignin | 11.0 | 75.0 | 1/9 | — | — | — | — |  |
|  | Liquid lignin |  |  |  | 11.23 | 17.4 | <0.05% | 0.00% |  |
|  | 10 min. activation |  |  |  | 11.04 | 16.8 | 1.07% | 2.03% |  |
|  | 30 min. activation |  |  |  | 10.98 | 18.0 | 0.91% | 2.03% |  |
|  | 60 min. activation |  |  |  | 10.96 | 19.2 | 0.75% | 2.03% |  |
|  | 120 min. activation |  |  |  | 10.90 | 22.2 | 0.60% | 2.03% |  |
|  | 240 min. activation |  |  |  |  |  |  |  |  |
| 7 | Lignin Activation: Kraft lignin | 8.0 | 75.0 | 1/9 | — | — | — | — |  |
|  | Liquid lignin |  |  |  | 8.11 | 12.0 | <0.05% | 0.00% |  |
|  | 10 min. activation |  |  |  | 8.01 | 12.6 | 1.65% | 2.03% |  |
|  | 30 min. activation |  |  |  | 7.98 | 12.0 | 1.65% | 2.03% |  |
|  | 60 min. activation |  |  |  | 7.91 | 12.6 | 1.64% | 2.03% |  |
|  | 120 min. activation |  |  |  | 7.67 | 13.2 | 1.60% | 2.03% |  |
|  | 240 min. activation |  |  |  |  |  |  |  |  |
| 8 | Lignin Activation: Kraft lignin | 12.0 | 75.0 | 1/9 | — | — | — | — |  |
|  | Liquid lignin |  |  |  | 12.21 | 12.6 | <0.05% | 0.00% |  |
|  | 10 min. activation |  |  |  | 12.08 | 14.4 | 0.78% | 2.03% |  |
|  | 30 min. activation |  |  |  | 12.04 | 15.0 | 0.57% | 2.03% |  |
|  | 60 min. activation |  |  |  | 11.89 | 15.0 | 0.44% | 2.03% |  |
|  | 120 min. activation |  |  |  | 11.94 | 17.4 | 0.28% | 2.03% |  |
|  | 240 min. activation |  |  |  |  |  |  |  |  |
| 9 | Lignin Activation: Kraft lignin | 6.0 | 75.0 | 1/9 | — | — | — | — | it is a "muddy" dispersion. |
|  | Liquid lignin |  |  |  | 5.98 | 12.0 | <0.05% | 0.00% |  |
|  | 10 min. activation |  |  |  | 5.89 | 10.8 | 2.01% | 2.03% |  |

TABLE 9-continued an overview of the laboratory examples and the samples taken.

| | | | | | | | | | |
|---|---|---|---|---|---|---|---|---|---|
| | | 30 min. activation | | | | 5.82 | 12.0 | 2.06% | 2.03% |
| | | 60 min. activation | | | | 5.88 | 10.2 | 2.02% | 2.03% |
| | | 120 min. activation | | | | 5.80 | 10.2 | 2.07% | 2.03% |
| | | 240 min. activation | | | | | | | |
| 10 | Lignin Activation: Kraft lignin | | 13.0 | 75.0 | 1/9 | — | — | — | — |
| | Liquid lignin | | | | | 13.09 | 12.0 | <0.05% | 0.00% |
| | 10 min. activation | | | | | 12.65 | 12.6 | 0.68% | 2.03% |
| | 30 min. activation | | | | | 12.69 | 13.8 | 0.49% | 2.03% |
| | 60 min. activation | | | | | 12.68 | 13.2 | 0.32% | 2.03% |
| | 120 min. activation | | | | | 12.66 | 16.2 | 0.18% | 2.03% |
| | 240 min. activation | | | | | | | | |
| 11 | Lignin Activation: Kraft lignin | | 10.0 | 98.0 | 1/9 | — | — | — | — |
| | Liquid lignin | | | | | 10.2 | 18.0 | <0.05% | 0.00% |
| | 10 min. activation | | | | | 9.93 | 20.4 | 1.18% | 2.03% |
| | 30 min. activation | | | | | 9.9 | 28.2 | 0.82% | 2.03% |
| | 60 min. activation | | | | | 9.84 | 58.2 | 0.66% | 2.03% |
| | 120 min. activation | | | | | 9.72 | 805.2 | 0.47% | 2.03% |
| | 240 min. activation | | | | | | | | |
| 12 | Lignin Activation: Kraft lignin | | 10.0 | 85.0 | 1/9 | — | — | — | — |
| | Liquid lignin | | | | | 10.2 | 17.4 | 0.07% | 0.00% |
| | 10 min. activation | | | | | 10.01 | 19.2 | 1.54% | 2.03% |
| | 30 min. activation | | | | | 9.92 | 22.8 | 1.30% | 2.03% |
| | 60 min. activation | | | | | 9.88 | 25.2 | 1.11% | 2.03% |
| | 120 min. activation | | | | | 9.81 | 43.2 | 0.94% | 2.03% |
| | 240 min. activation | | | | | | | | |
| 13 | Lignin Activation: Kraft lignin | | 10.0 | 70.0 | 1/9 | — | — | — | — |
| | Liquid lignin | | | | | 10.14 | 16.8 | <0.05% | 0.00% |
| | 10 min. activation | | | | | 10.01 | 16.2 | 1.62% | 2.03% |
| | 30 min. activation | | | | | 9.97 | 18.0 | 1.54% | 2.03% |
| | 60 min. activation | | | | | 9.96 | 19.8 | 1.44% | 2.03% |
| | 120 min. activation | | | | | 9.84 | 22.2 | 1.28% | 2.03% |
| | 240 min. activation | | | | | | | | |
| 14 | Lignin Activation: Kraft lignin | | 10.0 | 65.0 | 1/9 | — | — | — | — |
| | Liquid lignin | | | | | 9.98 | 18.0 | <0.05% | 0.00% |
| | 10 min. activation | | | | | 9.81 | 18.0 | 1.67% | 2.03% |
| | 30 min. activation | | | | | 9.71 | 17.4 | 1.65% | 2.03% |
| | 60 min. activation | | | | | 9.70 | 18.0 | 1.53% | 2.03% |
| | 120 min. activation | | | | | 9.57 | 22.8 | 1.41% | 2.03% |
| | 240 min. activation | | | | | | | | |
| 15 | Lignin Activation: Kraft lignin | | 10.0 | 60.0 | 1/9 | — | — | — | — |
| | Liquid lignin | | | | | 10.00 | 16.8 | <0.05% | 0.00% |
| | 10 min. activation | | | | | 10.00 | 16.8 | 1.69% | 2.03% |
| | 30 min. activation | | | | | 9.98 | 12.0 | 1.66% | 2.03% |
| | 60 min. activation | | | | | 9.94 | 18.0 | 1.56% | 2.03% |
| | 120 min. activation | | | | | 9.86 | 19.2 | 1.46% | 2.03% |
| | 240 min. activation | | | | | | | | |
| 16 | Lignin Activation: Sodium Lignosulphonate | | 10.0 | 75.0 | 1/9 | — | — | — | — | Mw Dist. (SEC) and NMR (2D HSQC) on samples; Liquid Lignin, 60 min Activation, and 120 min Activation. |
| | Liquid lignin | | | | | 9.61 | 9.0 | <0.05% | 0.00% |
| | 10 min. activation | | | | | 9.48 | 9.6 | 1.64% | 2.03% |
| | 30 min. activation | | | | | 9.38 | 9.6 | 1.58% | 2.03% |
| | 60 min. activation | | | | | 9.26 | 9.0 | 1.54% | 2.03% |
| | 120 min. activation | | | | | 8.98 | 9.0 | 1.44% | 2.03% |
| | 240 min. activation | | | | | 8.51 | 10.2 | 1.38% | 2.03% |
| 17 | Lignin Activation: Sodium Lignosulphonate | | 8.4 | 75.0 | 1/9 | — | — | — | — |
| | Liquid lignin | | | | | 8.4 | 11.4 | <0.05% | 0.00% |
| | 10 min. activation | | | | | 8.32 | 11.4 | 1.80% | 2.03% |
| | 30 min. activation | | | | | 8.33 | 11.6 | 1.79% | 2.03% |
| | 60 min. activation | | | | | 8.23 | 10.5 | 1.77% | 2.03% |
| | 120 min. activation | | | | | 8.12 | 11.7 | 1.7096 | 2.03% |
| | 240 min. activation | | | | | | | | |
| 18 | Lignin Activation: Kraft lignin | | 10.0 | 75.0 | 1/12 | — | — | — | — |
| | Liquid lignin | | | | | 10.9 | 18.0 | <0.05% | 0.00% |
| | 10 min. activation | | | | | 9.98 | 12.0 | 1.10% | 1.54% |
| | 30 min. activation | | | | | 10.01 | 19.2 | 0.98% | 1.54% |
| | 60 min. activation | | | | | 9.99 | 19.2 | 0.89% | 1.54% |
| | 120 min. activation | | | | | 9.87 | 21.6 | 0.72% | 1.54% |
| | 240 min. activation | | | | | 9.53 | 33.0 | 0.49% | 1.54% |

TABLE 9-continued an overview of the laboratory examples and the samples taken.

| Example number | Example type | Target pH | Target T° | CH2O(g)/ Lignin(g) | pH | Viscosity (cP) | Free-Formaldehyde (% wt.) - HPLC | Free-formaldehyde if no reaction (% wt.)- Calc. | Free-Phenol (% wt.) |
|---|---|---|---|---|---|---|---|---|---|
| 20 | LPF Resin: no lignin activation and no phenol metholation step | 10.0 | — | — | — | — | — | — | — |
|  | Liquid lignin |  |  |  | 9.98 | 18.6 |  | 0.00% |  |
|  | 10 min. condensation |  |  |  | 8.92 | 29.4 | 2.76% | 5.71% | 7.22% |
|  | 20 min. condensation |  |  |  | 8.89 | 33.4 | 1.97% | 5.71% | 6.34% |
| * | 30 min. condensation |  |  |  | 8.91 | 37.8 | 1.31% | 5.71% | 5.68% |
|  | 40 min. condensation |  |  |  | 8.89 | 43.2 | 0.97% | 5.71% | 5.17% |
|  | 50 min. condensation |  |  |  | 8.90 | 52.8 | 0.73% | 5.71% | 4.72% |
|  | 60 min. condensation |  |  |  | 8.91 | 60.0 | 0.58% | 5.71% | 4.41% |
|  | 70 min. condensation |  |  |  | 8.91 | 66.6 | 0.45% | 5.71% | 4.07% |
|  | 80 min. condensation |  |  |  | 8.89 | 68.4 | 0.38% | 5.71% | 3.76% |
| 21 | LPF Resin: with lignin activation but no phenol methylation step | 10.0 | — | 1/9 | — | — | — | — | — |
|  | Liquid lignin |  |  |  | 10.14 | 19.2 |  | 0.00% |  |
|  | 10 min. condensation |  |  |  | 8.95 | 30.6 | 2.90% | 5.71% | 7.51% |
|  | 20 min. condensation |  |  |  | 8.91 | 33.0 | 2.12% | 5.71% | 6.70% |
|  | 30 min. condensation |  |  |  | 8.89 | 39.6 | 1.65% | 5.71% | 6.17% |
| * | 40 min. condensation |  |  |  | 8.87 | 43.2 | 1.27% | 5.71% | 5.68% |
|  | 50 min. condensation |  |  |  | 8.85 | 49.2 | 1.03% | 5.71% | 5.30% |
|  | 60 min. condensation |  |  |  | 8.83 | 57.0 | 0.82% | 5.71% | 4.92% |
|  | 70 min. condensation |  |  |  | 8.83 | 67.8 | 0.66% | 5.71% | 4.57% |
|  | 80 min. condensation |  |  |  | 8.82 | 73.8 | 0.54% | 5.71% | 4.24% |
| 22 | LPF Resin: with lignin activation and phenol methylolation step | 10.0 | 75.0 | 1/9 | — | — | — | — | — |
|  | Liquid lignin |  |  |  | 10.10 | 18.6 |  | 0.00% |  |
|  | Methylolation |  |  |  | 8.76 | 39.0 | 2.15% | 5.71% | 6.62% |
| * | 10 min. condensation |  |  |  | 8.79 | 48.0 | 1.48% | 5.71% | 5.70% |
|  | 20 min. condensation |  |  |  | 8.76 | 55.2 | 1.13% | 5.71% | 5.17% |
|  | 30 min. condensation |  |  |  | 8.79 | 64.8 | 0.90% | 5.71% | 4.71% |
|  | 40 min. condensation |  |  |  | 8.79 | 76.2 | 0.71% | 5.71% | 4.33% |
|  | 50 min. condensation |  |  |  | 8.77 | 79.8 | 0.60% | 5.71% | 3.98% |
|  | 60 min. condensation |  |  |  | 8.77 | 81.6 | 0.49% | 5.71% | 3.71% |
|  | 70 min. condensation |  |  |  | 8.78 | 76.8 | 0.43% | 5.71% | 3.36% |
|  | 80 min. condensation |  |  |  | 8.76 | 82.8 | 0.34% | 5.71% | 3.19% |

* Samples from LPF Resin examples 20-22 that had their Mw distributions measured (SEC analysis). They were selected based on a free phenol normalisation = 5.7%

Aside—the pH of the liquid lignins should have matched the target pH exactly; however since the amount of alkali is based on the adjustment of a small sample, and its subsequent scale up and hold for an additional hour whereby the lignin macromolecule can further "open up", some tolerance was allowed. Furthermore the inventive steps of the patent can still be illustrated without compromise.

TABLE 10

Molecular weight distribution parameters for samples taken from Examples 4 and 16.

| SEC Analysis | Example 4 | | | Example 16 | | |
|---|---|---|---|---|---|---|
|  | Mn (g/mol) | Mw (g/mol) | PD | Mn (g/mol) | Mw (g/mol) | PD |
| Liquid Lignin | 1802 | 3798 | 2.1 | 2156 | 9632 | 4.5 |
| Activated lignin 60 min | 1988 | 4402 | 2.2 | 2255 | 10316 | 4.6 |
| Activated lignin 120 min | 2051 | 4764 | 2.3 | 2300 | 10543 | 4.6 |

TABLE 11

Molecular weight distribution parameters for samples taken from Examples 20 (30 min condensation), 21 (40 min condensation) & 22 (10 min condensation).

| SEC Analysis |  | Mn (g/mol) | Mw (g/mol) | PD |
|---|---|---|---|---|
| selection based on a free phenol normalisation ≈ 5.7% | Example 20 (30 min condensation) | 737 | 3039 | 4.1 |
|  | Example 21 (40 min condensation) | 750 | 3253 | 4.3 |
|  | Example 22 (10 min condensation) | 749 | 3561 | 4.8 |

TABLE 12

Summary of 2D HSQC NMR analysis for Examples 4 and 16

|  |  | Liquid Lignin | 60 min. activation | 120 min. activation |
|---|---|---|---|---|
| Example 4 (Kraft) | Methylol (—CH$_2$OH) signal | No signal | Strong signal | Slightly stronger signal |

TABLE 12-continued

Summary of 2D HSQC NMR analysis for Examples 4 and 16

|  |  | Liquid Lignin | 60 min. activation | 120 min. activation |
|---|---|---|---|---|
| Example 16 (Na Lignosulphonate) | Guaiacyl unit G5 active hydrogen signal | Strong signal | Weak signal | Slightly weaker signal |
|  | Methylol (—CH$_2$OH) signal | No signal | Strong signal | Slightly stronger signal |
|  | Guaiacyl unit G5 active hydrogen signal | Strong signal | Weak signal | Slightly weaker signal |

TABLE 13

Examples 23 (LPF resin with activation and methylolation step) and 24 (LPF resin with only a condensation step), 6 mm HPL compact panel testing.

|  |  | EN-438 pt2 compliant product specification | Example 23 Lignin activation and methylolation steps | Example 24 No lignin activation and no methylolation step |
|---|---|---|---|---|
| Resistance to immersion in boiling water | Thickness Increase | <2% | Significantly below 2% | Above 2% |
|  | Mass increase | <2% | Significantly below 2% | Above 2% |
|  | Visual ≥4 |  | 5 | 4 |

Examples 4 to 10—Lignin Activation Step and Variance in pH

With reference to the earlier section and Table 9 we see that for Examples 4 to 10 (wherein the sample lignin activation recipe and procedure are the same apart from a variation in potassium hydroxide concentration and the consequent pH parameter associated with it) that the formaldehyde concentration decreases with the hold time of the activation step, and that the rate of this decrease is related to how alkaline the batch is (i.e. how high the pH is).

By abstracting the results from Table 9 and plotting a chart, free formaldehyde (%) verses activation time (minutes), the dependency of the reaction kinetics on pH conditions can be seen more clearly. FIG. 1 illustrates this.

It can be seen that for Kraft lignin, the higher the pH is, the faster the reaction is with formaldehyde, leading to its consequent drop in concentration with time. Specifically we can note that at pH6, and therefore logically at pH's below this, there is hardly any reaction. As the pH increases the reaction kinetics improve, with the change in reaction rate appearing to be most sensitive in the region pH 8 to 12, and in particular between pH 9 and 11. Increasing the pH further from 12 to 13 results in a less dramatic rate increase.

For an impregnation resin, the examples with higher charges of alkali (e.g. potassium hydroxide) are less preferred since with higher pH's it can lead to fast reaction kinetics, not only for the lignin activation but also for the methylolation and condensation reactions with phenol and formaldehyde. It is then more difficult to control the degree of condensation, and there is a greater risk of over condensing the resin. With such an over condensed resin it is then more difficult to impregnate kraft paper due to the higher molecular weight. Furthermore even if the paper is successfully impregnated, its activity is perhaps higher than desired, leading to excessive advancement of the resin curing in the impregnation line's drying section. This would lead to poor resin flow and poor HPL panel pressing. Additionally, an excessive amount of alkali (e.g. potassium hydroxide) can lead to excessive salt content within the laminate, and a potential to fail in water resistance tests; for example swelling during submergence in boiling water.

Examples 4, & 11 to 15—Lignin Activation Step and Variance in Lignin Activation Temperature Again, with reference to the earlier section and Table 9 we see that for Examples 4, and 11 to 15 (wherein the sample lignin activation recipe and procedure are the same apart from a variation in the lignin activation temperature) that the formaldehyde concentration decreases with the hold time of the activation step, and that the rate of this decrease is related to how high the temperature is.

Figure 2:
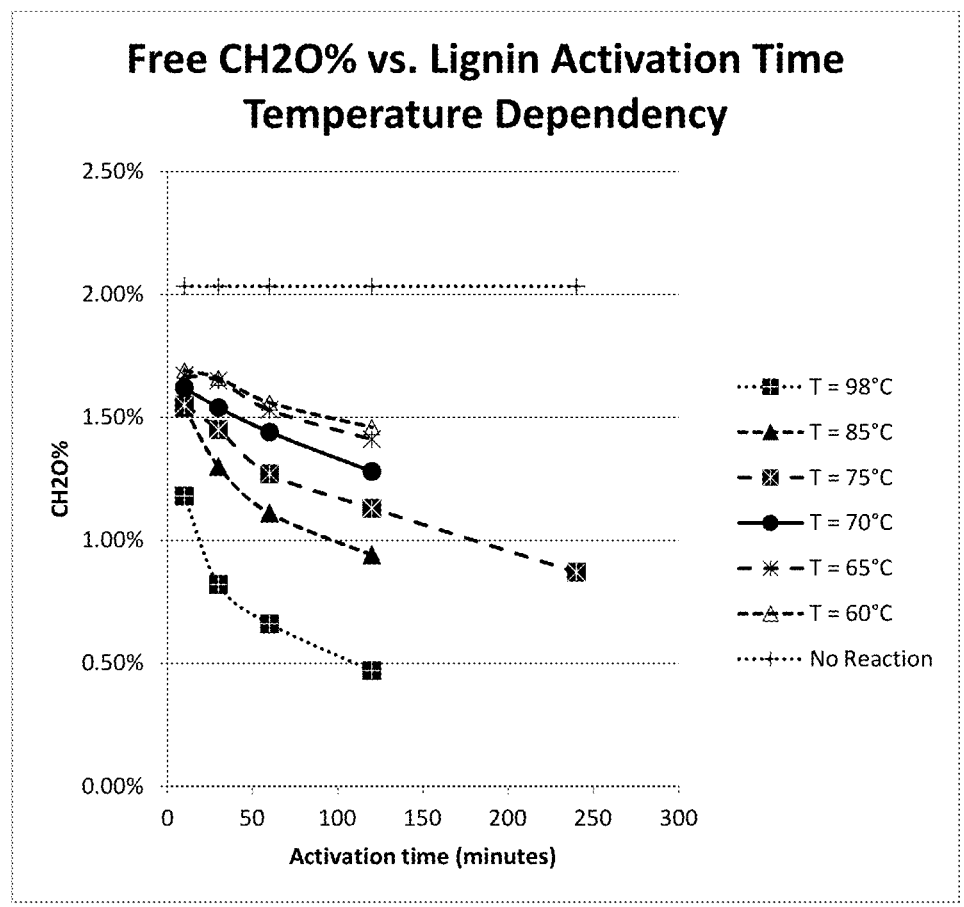
FIG. 2 is a graph illustrating lignin activation with variation in temperature.

By abstracting the results from Table 9 and plotting a chart, free formaldehyde (%) verses activation time (minutes), the dependency of the reaction kinetics on temperature can be seen more clearly. FIG. 2 illustrates this.

Figure 7:
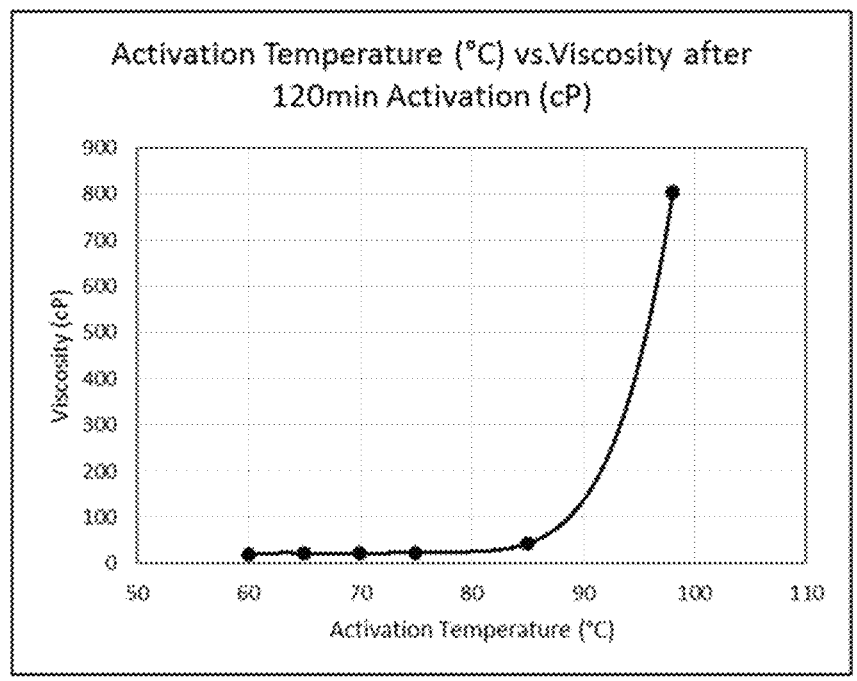
FIG. 7 is a graph illustrating activation temperature versus viscosity.

It can be seen that for kraft lignin, higher temperatures result in a faster reaction with formaldehyde, with its consequent drop in concentration with time. The lower temperatures, give greater control over the methylolation reaction, however below 60° C. it is perhaps too slow to be preferred for most commercial resin manufactures. At higher temperatures, the condensation reaction starts to become significant; by looking at the viscosity results from table 9, we see there is a significant increase after 85° C.—indicative of chain polymerisation and molecular weight build up due to the condensation reaction. Furthermore, to illustrate this point, the viscosities from Examples 4, 11-15 after 120 mins activation have been reproduced in Table 14 below. They have also been plotted as a graph with a polynomial fit through the data points; this can be seen in FIG. 7.

TABLE 14

Activation Temperature (° C.) vs. Viscosity after 120 min Activation (cP)

| Example Number | Activation Temperature (° C.) | Viscosity after 120 min Activation (cP) |
|---|---|---|
| 15 | 60 | 19.2 |
| 14 | 65 | 22.8 |
| 13 | 70 | 22.2 |
| 4 | 75 | 24.0 |
| 12 | 85 | 43.2 |
| 11 | 98 | 805.2 |

Polymerisation of the already large lignin molecules, leads to difficult paper impregnation. The resin cannot penetrate into the pores or between the fibres of the paper, or flow adequately during pressing.

Therefore it is preferred to perform the lignin activation at temperatures that are advantageous to methylolation but not to condensation polymerization; i.e. between 60° C. and 85° C., and even more preferably between 65° C. and 80° C.

Examples 16 & 17—Activation of Sodium Lignosulphonate, and its Comparison with Example 4.

Again, with reference to the earlier section and Table 9 we see that for Examples 16 and 17, a commercial sodium lignosulphonate was also tested. Sodium lignosulphonate is inherently soluble in water and requires no alkali to solubilise it. Therefore, with Example 17 no potassium hydroxide was added—this was to test its lowest pH condition, which was pH=8.4. Example 16, had its pH adjusted to ≈10 so that it can be compared to Example 4.

Figure 3:
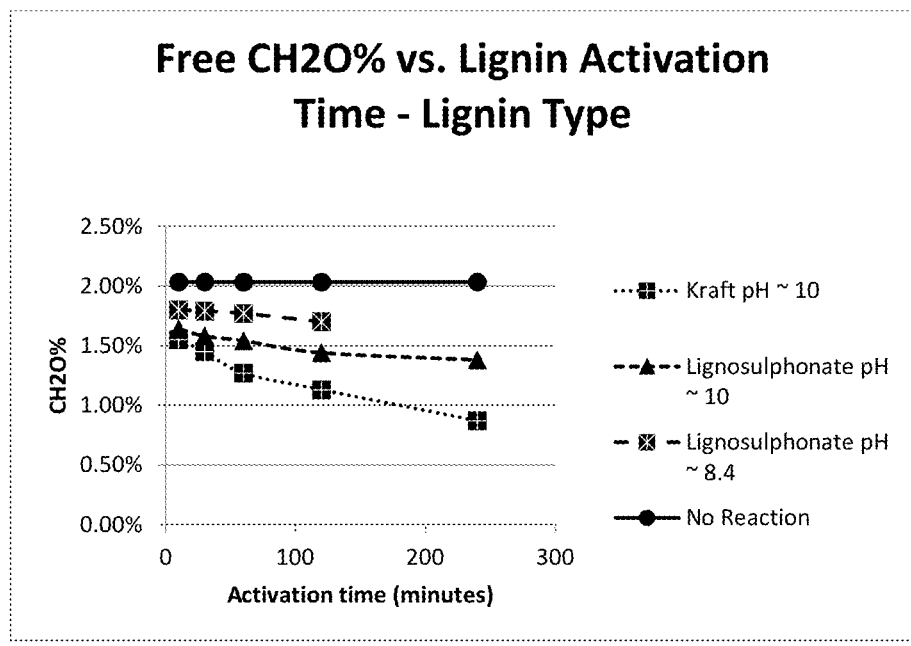
FIG. 3 is a graph illustrating lignin activation with a comparison between Kraft lignin and sodium lignosulphonate.

Table 9 lists the results of the samples taken from Examples 4, 16 & 17. FIG. 3 illustrates their change in formaldehyde concentration during the activation step.

In both Examples 16 and 17 there was hardly any change in viscosity, but there was some reduction in formaldehyde concentration—this being more noticeable at pH~10. It indicates that the lignin activation can occur with other lignin raw materials, and not just with kraft lignin.

Figure 4:
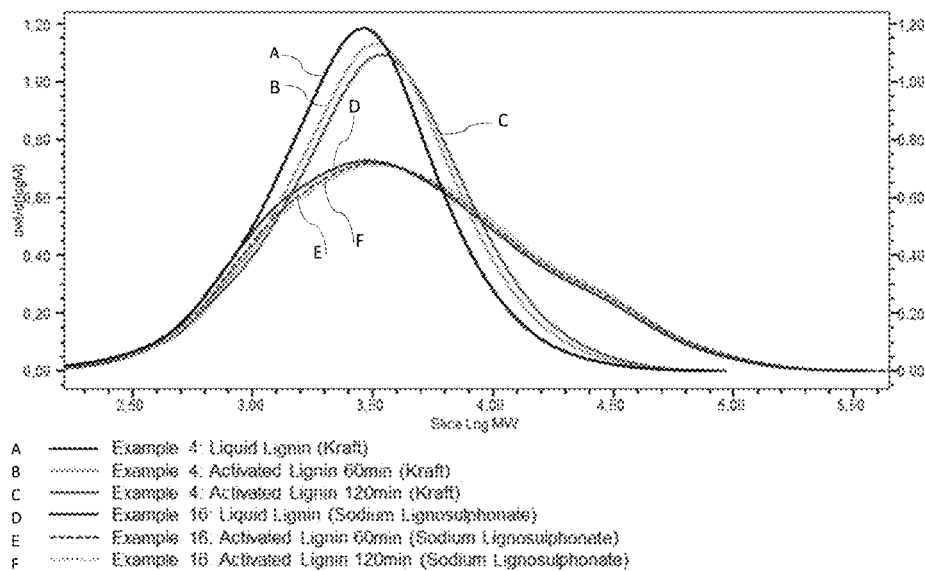
FIG. 4 is a graph illustrating molar mass distribution examples.
Figure 5:
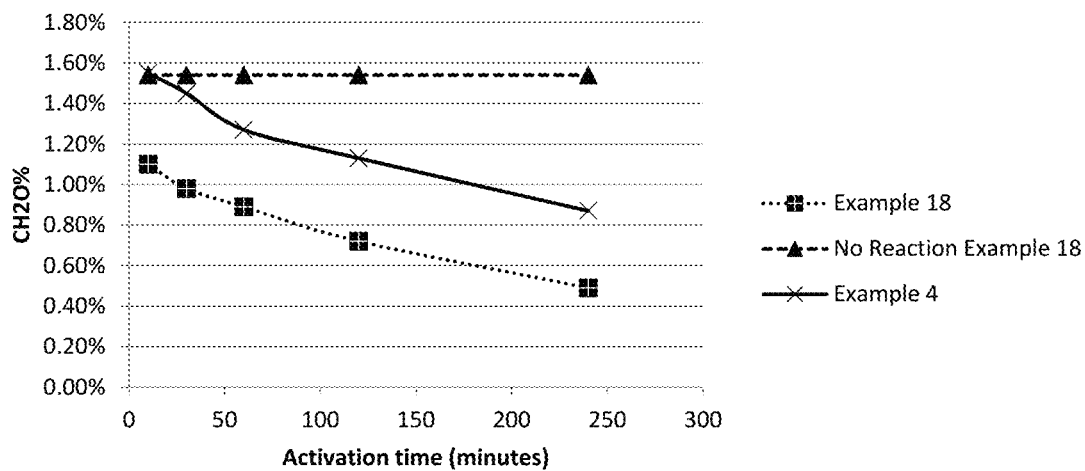
FIG. 5 is a graph illustrating different charges of formaldehyde relative to Kraft lignin.

SEC analysis was also performed on "liquid lignin", "60 min. activation" and "120 min. activation" samples from Examples 4 and 16. The results can be seen in Table 10. There is some marginal increase in molecular weight during the lignin activation, but not much, and this is interpreted as more functionalization of the lignin macromolecule (i.e. introduction of methylol groups) and its associated change in hydrodynamic volume, rather than the polymerisation of the lignin. It can be seen more clearly in FIG. 4; where the molecular weight distributions of the six samples are plotted.

It can also be seen how the Kraft lignin has a lower molecular weight distribution than the sodium lignosulphonate.

Additional to the SEC analysis, the samples "liquid lignin", "60 min. activation" and "120 min. activation" from Examples 4 and 16 were examined by 2D HSQC NMR. What was particularly interesting about the spectra obtained, was that signals were seen for the methylol group (—$CH_2OH$) and the aromatic active hydrogens. Table 12 shows qualitatively the most important results. From these spectra, it was confirmed that the desired methylolation of lignin, at sites with active hydrogens, does indeed occur.

The signal for the methylol group (—$CH_2OH$) is absent from the spectra of the two liquid lignins (i.e. kraft [Example 4] and Sodium lignosulphonate [Example 16]). Then after the addition of formaldehyde (1 g $CH_2O$ on 9 g dry lignin) and after holding at 75° C., pH10 for 1 hour, the methylol group (—$CH_2OH$) signal can be seen with both lignin types (i.e. kraft [Example 4] and Sodium lignosulphonate [Example 16]). Furthermore, by holding at 75° C., pH 10 for an additional hour it was observed with both lignin types that the methylol group signal strengthened. It should be noted that this methylol group signal appeared to be stronger with kraft lignin (Example 4) than with lignosulphonate (Example 16); this matches the observation regarding the consumption of formaldehyde as made by HPLC analysis, at 75° C. pH 10, and as shown by FIG. 3—that the kraft lignin sample reacted with formaldehyde more readily than the lignosulphonate sample did with formaldehyde.

As previously stated, it was noted that in the 2D NMR HSQC spectra there were regions for the aromatic active hydrogens on lignin. These as were associated with Guaiacyl units (G) and p-Hydroxyphenyl units (H), and in particular there were regions that could be associated with;
  active hydrogens H2 & H6
  active hydrogen G6
  active hydrogens G5, H3 & H5
  active hydrogen G2

In the liquid lignin samples (both "Kraft" and "lignosulphonate"), the signal associated with H2 and H6 was much lower than the signals from G2 and G6. It could therefore be stated that guaiacyl units (G) were far more abundant than p-Hydroxyphenyl units (H) in both of the lignin types tested. It then followed logically that the signal for the region G5, H3 & H5 was predominantly coming from G5.

In the activated lignin samples (both "Kraft" and "lignosulphonate"), we see a very strong reduction in the G5, H3 & H5 signal. This signal reduction is slightly more after 120 minutes activation than 60 minutes activation, and is more significant in the kraft lignin example than the lignosulphonate example.

In summary:
  the lignin methylol signal seen in the 2D NMR is proportional to the amount of formaldehyde consumed in the lignin activation step
  the lignin methylol signal is inversely proportional to the G5, H3 & H5 signal region, which suggests that methylolation is taking place predominantly at these positions.
  The "Lignin Activation" step, is a methylolation of the lignin, which is in effect a functionalization of the lignin, with only a marginal increase in molecular weight.
  Since it is the lignin active hydrogens that have been methylolated in the two different lignin types, it is logical to one skilled in the art that any liquid lignin possessing active hydrogen could be used and therefore suitably activated for use in a lignin phenol formaldehyde (LPF) resin synthesis.

Example 18 and its comparison with Example 4—Lignin activation: 1 g CH2O on 12 g of Lignin vs 1 g on 9 g of Lignin.

Building on the discussion regarding "Step 2—Lignin Activation", the stoichiometry of formaldehyde to lignin can be based on the mass of dry lignin that the mixture contains; and more specifically—the moles of active hydrogen sites that the said lignin contains. The formaldehyde is added in a stoichiometric excess i.e. >1:1 relative to the lignin's free active hydrogen positions so as to aid the reaction kinetics and to optionally provide a certain amount pre-dosing of formaldehyde prior phenol addition.

Example 18 is an example wherein the formaldehyde has been added in a stoichiometric 1:1 molar ratio with active hydrogens.

Examples 20, 21 & 22—Lignin Formaldehyde Resins (LPF)

The Examples 20, 21 & 22 were comparable in terms of raw materials charged, and the resin condensation stage (90° C.). The differences between these examples though were:
  Example 20—No lignin activation step & No phenol methylolation step. i.e. Liquid lignin+phenol+formaldehyde and allowed to exotherm to the condensation temperature.
  Example 21—Lignin activation step (1 hr 75° C.), but No phenol methylolation step.
  Example 22—Lignin activation step (1 hr 75° C.) & phenol methylolation step (1 hr continuous formalin dosing followed by 1 hr hold, all at 75° C.).

For each resin, samples were taken of the liquid lignin and at 10 minute intervals during the condensation stage. Additionally for Example 22, a sample was taken at the end of the phenol methylolation stage. The analytical results for these samples can be seen in Table 9, the parameters measured being; pH, Viscosity, Free formaldehyde % (titrino and HPLC), and free phenol %.

These results were studied, with the aim of finding one sample from each of the three Examples that had a similar free phenol % results to those of the other (i.e. condensing to a specific free phenol). By "normalising" on a specific free phenol % content, it was then possible to run SEC analysis on these samples, and compare the three different processing routes on the resin's molecular weight distribution.

The samples selected were;
Example 20 (30 minute condensation) free phenol 5.68%
Example 21 (40 minute condensation) free phenol 5.68%
Example 22 (10 minute condensation) free phenol 5.70%

Table 11 contains the numeric results from the SEC analysis for these samples; Mn, Mw & PD. They are fairly similar, however it can be seen that Example 20 has the lowest Mn, Mw and polydispersity, whilst Example 22 has the highest Mn, Mw and polydispersity. This initially would seem to suggest that the example with the lignin activation step and the phenol methylolation step would have the worst behaviour regarding HPL/CPL laminate applications.

Figure 6:
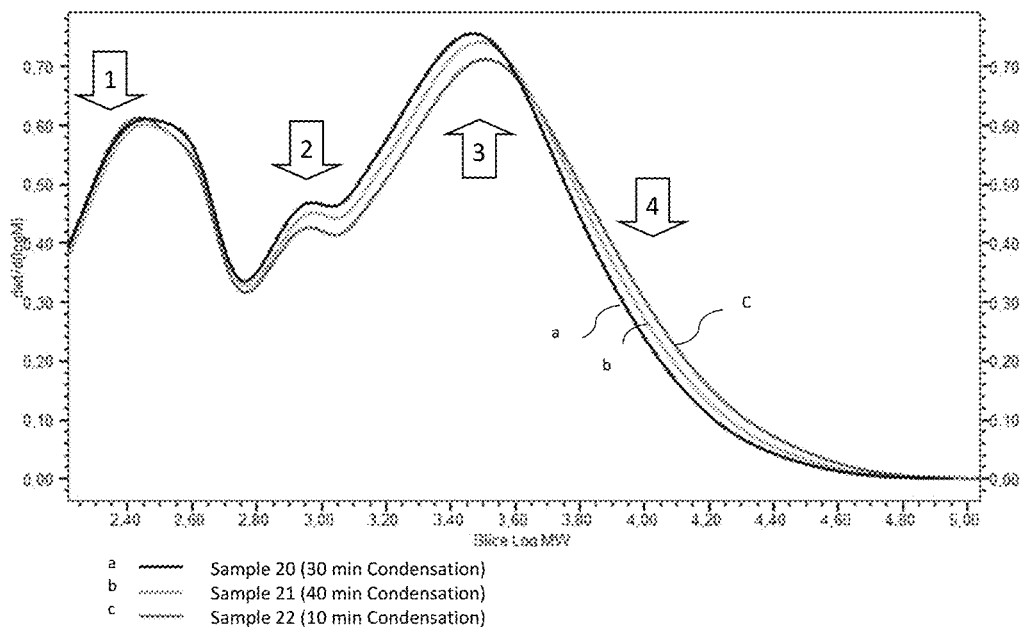
FIG. 6 is a graph illustrating molar mass distribution examples.

However, closer inspection of the graphical molecular weight distributions reveal features that actually support the invention and said use in HPL/CPL laminate applications. The FIG. 6 illustrates these molecular weight distributions as derived from the SEC analysis, and the 4 important regions for the following interpretation and reasoning.

Block arrow "1" indicates a region of low molecular weight phenol formaldehyde resin species. However in this region it can be seen that Example22 (with the lignin activation and phenol methylolation steps) has an asymmetric peak dominated by the lowest molecular weight species, whereas Example 20 has a broader more symmetric peak indicating a shift to higher molecular weight PF species.

Furthermore, with Block arrow "2" we see a region indicative of medium molecular weight PF species. This is more differentiated, even though it is a shoulder on the area assigned to lignin. It shows that Example 22 has less medium molecular weight PF species than Example 20. Therefore, it can be stated that with respect to phenol formaldehyde resin species, Example 20 is higher Mw than Example 21, which is in turn higher than Example 22.

Block arrow "3" indicates the region of kraft lignin. Here Example 22 shows that the lignin component has a shift to higher Mw compared to that from Example 20. Compare this with the results from Examples 4—"liquid lignin", "activated lignin 60 min" and "activated lignin 120 min"—they look very similar. The lignin in Example 20 has not had time to react with the formaldehyde and so has not been activated; the resin will perform poorly since the lignin is only a filler. With the activation step, the kraft lignin is methylolated and increases marginally in Mw. This can be seen with Example 21 and even more so in Example 22, since lignin activation continues to occur also during the phenol methylolation step. This resin will perform much better in application, because the lignin is now a reactive component.

Block arrow "4" indicates the region of highest Mw species from the lignin—clearly as with block arrow "3" the lignin activation causes a shift to higher molecular weight due to functionalization and possibly by reaction of the lignin methylol groups with small PF resin species, which would also give rise to a cluster of reactive sites on the lignin macromolecule.

Examples 23 and 24—Manufacturing of HPL Compact Panels 6 mm.

With reference to the earlier section and Table 13, we see that for Examples 23 and 24 there was a clear pass or fail for the 6 mm compact HPL laminates tested.

The laminates were tested according to EN-438. This comprises of several tests, of which one of the most demanding tests is the "resistance to immersion in boiling water". This is a good test for laminates, since failure can indicate; lack of crosslinking and cure, poor resin flow between papers on pressing, and poor impregnation of the paper.

As can be seen in Table 13, Example 23 (LPF with lignin activation and phenol methylolation steps) successfully passed this test, whilst Example 24 (LPF no lignin activation or phenol methylolation steps) failed. Furthermore, Example 23 fulfilled all requirements of EN-438, such as dimensional stability at higher temperatures, flexural strength, flexural modulus and density.

In summary, a clear advantage could be seen by having the lignin activation and phenol methylolation steps, with which the present inventors found that it was possible to impregnate paper and make a EN438 compliant 6 mm thickness compact HPL panel using a lignin phenol formaldehyde (LPF) resin with equal parts phenol and lignin (i.e. 50% phenol replacement).

It is apparent from the experiments that by not activating the lignin through methylolation, there is insufficient reactivity towards other phenolic resin reactive species, and the panels made with such resin fail the EN-438. In this situation, the lignin is acting more as an extender or filler to the phenol-formaldehyde resin. Maximum reactivity of lignin to phenolic resin reactive species is obtained when the active hydrogen sites of the lignin are fully functionalised with methylol groups and not lost through higher temperature condensation reactions during resin cooking. This is achieved only by having a stoichiometric ratio of lignin active hydrogens to formaldehyde that has formaldehyde in excess (i.e. lignin active hydrogens:formaldehyde=1:>1. The fully methylolated lignin is then better at reacting with the other phenolic resin species and forming an infusible polymer within the laminate during final pressing; evidenced by resistance to the boiling water test. This optimal methylolation of lignin by use of the excess stoichiometric ratio, also allows for maximum use of lignin within the resin recipe whilst still fulfilling the requirements of the EN-438 Norm.

When the above is combined with phenolic resin species that are predominately methylolated and of low molecular weight, paper/wood fibre penetration during impregnation is maximised as is reactivity during the high temperature/pressure press process of the laminate manufacture (either HPL or CPL).

The invention claimed is:

1. A method for manufacturing a high pressure laminate comprising a step of preparing a core layer and a step of pressing said core layer in a press using an elevated temperature and an elevated pressure, wherein said step of preparing said core layer comprises impregnating a paper with a resin mixture and constructing a stack of resin impregnated papers, wherein said resin mixture comprises a lignin-phenol formaldehyde resin prepared with lignin methylolation and phenol methylolation steps, said step of lignin methylolation comprises:
   i) providing a liquid lignin having free active hydrogen positions;
   ii) heating said liquid lignin to a temperature in a range of 60° C. to 85° C.;
   iii) adding formaldehyde to said heated liquid lignin under stirring conditions, wherein the formaldehyde is added in a stoichiometric excess ratio of >1:1 relative to the lignin's free active hydrogen positions;
   iv) maintaining the temperature of the mixture according to iii) in a range of 60° C. to 85° C., during a time period of at least 10 minutes thereby obtaining an activated lignin composition,
said step of phenol methylolation comprises:
   v) optionally heating said activated lignin composition of step iv) to a temperature in a range of 50° C. to 90° C.;

vi) adding phenol to said activated lignin composition;
vii) adjusting the temperature of the mixture of step vi) to be within the range of 60° C. to 90° C.;
viii) adding formaldehyde to said mixture of step vii),
ix) comprising of heating and maintaining the mixture of step viii) at a temperature in a range 50° C. to 80° C., during a period of time of at least 10 minutes, thereby obtaining said lignin-phenol formaldehyde resin.

2. The method according to claim 1, wherein optional step v) is carried out in a range of 50° C. to 85° C.

3. The method according to claim 1, wherein step vii) is carried out in a range of 60° C. to 85° C.

4. The method according to claim 1, wherein step ix) is carried out at a range of 60° ° C. to 80° C.

5. The method according to claim 1, wherein step ix) is carried out for at least 30 minutes.

6. The method according to claim 1, wherein the liquid lignin having free active hydrogen positions has a pH of at least 6.

7. The method according to claim 1, wherein the temperature according to step ii) is in a range of 65° C. to 80° C.

8. The method according to claim 1, wherein the temperature according to step iv) is in a range of 65° ° C. to 80° C.

9. The method according to claim 1, wherein the period of time according to step iv) is in a range of 15 minutes to 4 hours.

10. The method according to claim 1, wherein the addition of formaldehyde to the heated liquid lignin according to step iii) is carried out on a continuous basis over a period of time or by one or more doses of formaldehyde.

11. The method according to claim 1, wherein said lignin-phenol formaldehyde resin, prepared with lignin methylolation and phenol methylolation steps, for impregnating paper for use in said core layer is a lignin-phenol formaldehyde resin in which a resin recipe specifies that the weight of dry lignin used is equal to the weight of the dry phenol used.

12. The method according to claim 1, wherein optional step v) is carried out in a temperature in a range of 65° C. to 80° C.

13. The method according to claim 1, wherein the addition of formaldehyde according to step viii) is carried out on a continuous basis over a period of time or by the stepwise addition of two or more doses of formaldehyde.

14. The method according to claim 1, wherein the addition of formaldehyde according to step viii) occurs in a period of time between 20 and 150 minutes.

15. The method according to claim 1, wherein the temperature during step viii) is maintained in a range of 60° ° C. to 85° C.

16. The method according to claim 1, wherein the amount of formaldehyde added according to step viii) is related to the amount of phenol added according to step vi) and the amount of residual free formaldehyde in the activated lignin, the combination of the amount of formaldehyde added in step viii) together with the amount of formaldehyde residual in the activated lignin when compared with the amount of phenol charged in step vi), refers to a molar ratio Phenol:Formaldehyde in the range of 1.0:0.9 to 2.0.

17. The method according to claim 1, wherein step ix) of methylolation is maintained during a period of time between 40 and 120 minutes.

18. The method according to claim 1, wherein the mixture obtained after step ix) is cooled.

19. The method according to claim 1, wherein said lignin-phenol formaldehyde resin impregnated papers are made with saturation base kraft papers.

20. The method according to claim 1, wherein said core layer comprises a combination of prepregs made of wood fibres and said lignin-phenol formaldehyde resin impregnated papers.

21. The method according to claim 20, wherein said lignin-phenol formaldehyde resin impregnated papers are positioned as an outer-layer of the core-material while having prepregs in the middle.

22. The method according to claim 20, wherein said prepegs and lignin-phenol formaldehyde resin impregnated papers are interlaced such that said impregnated papers are positioned between said prepregs or are positioned as an outer-layer of the core-material.

23. The method according to claim 1, wherein said core layer is combined with one or more decorative layers, wherein said one or more decorative layers are positioned on one side or on both sides of the core-layers.

24. The method according to claim 23, wherein said one or more decorative layers are based on decorative papers saturated with thermosetting resin like melamine-formaldehyde resin.

25. The method according to claim 23, wherein said one or more decorative layers are coated using an acrylic resin and hardened using a UV-curable or EB-curable system.

* * * * *